US011963918B2

(12) United States Patent
Hildenbrand et al.

(10) Patent No.: US 11,963,918 B2
(45) Date of Patent: Apr. 23, 2024

(54) PATIENT BED HAVING ACTIVE MOTION EXERCISE

(71) Applicant: Hill-Rom Services, Inc., Batesville, IN (US)

(72) Inventors: Chris L Hildenbrand, Osgood, IN (US); Michael Buccieri, Greenfield, IN (US); Kaitlyn Colon, Greensburg, IN (US)

(73) Assignee: Hill-Rom Services, Inc., Batesville, IN (US)

(*) Notice: Subject to any disclaimer, the term of this patent is extended or adjusted under 35 U.S.C. 154(b) by 408 days.

(21) Appl. No.: 17/205,533

(22) Filed: Mar. 18, 2021

(65) Prior Publication Data

US 2021/0322235 A1 Oct. 21, 2021

Related U.S. Application Data

(60) Provisional application No. 63/071,046, filed on Aug. 27, 2020, provisional application No. 63/012,481, filed on Apr. 20, 2020.

(51) Int. Cl.
*A61G 7/002* (2006.01)
*A61G 7/005* (2006.01)
(Continued)

(52) U.S. Cl.
CPC .......... *A61G 7/002* (2013.01); *A61G 7/015* (2013.01); *A61G 7/05* (2013.01); *A61G 7/1034* (2013.01);
(Continued)

(58) Field of Classification Search
CPC .......... A61G 7/002; A61G 7/015; A61G 7/05; A61G 7/1034; A61G 7/005; A61G 2200/32; A61G 2200/34; A61G 7/012; A61G 7/0527; A63B 21/1672; A63B 21/4045; A63B 23/04; A63B 21/068; A63B 2208/0238; A63B 2208/0252; A63B 2210/04; A63B 2220/16; A63B 2220/17;
(Continued)

(56) References Cited

U.S. PATENT DOCUMENTS 238,799 A 3/1881 Moegan
1,018,757 A 2/1912 Grady
(Continued)

FOREIGN PATENT DOCUMENTS

CN 1420753 A 5/2003
CN 201668630 U 12/2010
(Continued)

OTHER PUBLICATIONS

Chinese Office Action for Application No. 202110363404.7, dated Apr. 6, 2022, 9 pages.

*Primary Examiner* — Garrett K Atkinson
(74) *Attorney, Agent, or Firm* — Barnes & Thornburg LLP

(57) ABSTRACT

A patient support apparatus may include a frame and an articulated deck coupled to the frame. The articulated deck may include a head section, a seat section, a thigh section, and a foot section. The seat section may include a stationary frame coupled to the frame and a moveable frame that moves relative to the stationary frame. The moveable frame may move between a retracted position and an extended position.

23 Claims, 26 Drawing Sheets

(51) Int. Cl.

| | |
|---|---|
| *A61G 7/015* | (2006.01) |
| *A61G 7/05* | (2006.01) |
| *A61G 7/10* | (2006.01) |
| *A63B 21/00* | (2006.01) |
| *A63B 21/068* | (2006.01) |
| *A63B 21/16* | (2006.01) |
| *A63B 23/04* | (2006.01) |

(52) U.S. Cl.

CPC ...... *A63B 21/1672* (2015.10); *A63B 21/4045* (2015.10); *A63B 23/04* (2013.01); *A61G 7/005* (2013.01); *A61G 2200/32* (2013.01); *A61G 2200/34* (2013.01); *A63B 21/068* (2013.01); *A63B 2208/0238* (2013.01); *A63B 2208/0252* (2013.01); *A63B 2210/04* (2013.01); *A63B 2220/16* (2013.01); *A63B 2220/17* (2013.01); *A63B 2220/62* (2013.01)

(58) Field of Classification Search

CPC ............ A63B 2220/62; A63B 2220/13; A63B 2225/096; A63B 22/203; A63B 2023/0411; A63B 2071/0081; A63B 2220/51; A63B 2220/52; A63B 2225/09; A63B 23/0211; A63B 71/0622; A63B 2208/0247; A63B 2208/0261; A63B 2230/067; A61H 31/00

See application file for complete search history.

(56) References Cited

U.S. PATENT DOCUMENTS

| | | | | |
|---|---|---|---|---|
| 1,561,979 | A | | 11/1925 | Gore |
| 1,735,569 | A | | 11/1929 | Gregory |
| 2,340,666 | A | | 2/1944 | Johanson |
| 2,598,204 | A | | 5/1952 | Allen |
| 2,768,622 | A | | 10/1956 | Sanders |
| 2,845,063 | A | | 7/1958 | Allen |
| 3,220,022 | A | | 11/1965 | Nelson |
| 3,455,295 | A | | 7/1969 | Kellogg |
| 3,524,643 | A | | 8/1970 | Hazelitt, Sr. |
| 3,527,202 | A | | 9/1970 | Donzelle |
| 3,589,358 | A | | 6/1971 | Megal |
| 3,741,200 | A | | 6/1973 | Morin |
| 3,759,252 | A | | 9/1973 | Berman |
| 3,760,801 | A | | 9/1973 | Borgeas |
| 3,821,953 | A | | 7/1974 | Mikan |
| 3,826,490 | A | | 7/1974 | Mossman |
| 3,868,734 | A | | 3/1975 | Benoit |
| 3,887,180 | A | | 6/1975 | Berman |
| 3,892,404 | A | | 7/1975 | Martucci |
| 4,113,250 | A | | 9/1978 | Davis |
| 4,169,591 | A | | 10/1979 | Douglas |
| 4,378,791 | A | | 4/1983 | Sarrell |
| 4,383,684 | A | | 5/1983 | Schliep |
| 4,409,695 | A | | 10/1983 | Johnston et al. |
| 4,444,178 | A | | 4/1984 | Kuo |
| 4,509,509 | A | | 4/1985 | Bouvet et al. |
| 4,603,687 | A | | 8/1986 | Greenwood |
| 4,615,335 | A | | 10/1986 | Searcy |
| 4,620,704 | A | | 11/1986 | Shifferaw |
| 4,621,620 | A | | 11/1986 | Anderson |
| 4,638,793 | A | | 1/1987 | Therkorn |
| 4,672,697 | A | | 6/1987 | Schuerch |
| 4,798,197 | A | | 1/1989 | Nippoldt et al. |
| 4,825,852 | A | | 5/1989 | Genovese et al. |
| 4,847,929 | A | | 7/1989 | Pupovic |
| 4,867,143 | A | | 9/1989 | Morin |
| 4,890,604 | A | | 1/1990 | Nelson |
| 4,913,424 | A | | 4/1990 | Pepin |
| 4,925,184 | A | | 5/1990 | Mcjunkin, Jr. et al. |
| 4,928,957 | A | | 5/1990 | Lanier et al. |
| 4,995,378 | A | | 2/1991 | Dyer et al. |
| 5,005,829 | A | | 4/1991 | Caruso |
| 5,024,214 | A | | 6/1991 | Hayes |
| 5,078,325 | A | | 1/1992 | Waryu et al. |
| 5,098,089 | A | | 3/1992 | Harrington et al. |
| 5,107,822 | A | | 4/1992 | Ohashi |
| 5,125,884 | A | | 6/1992 | Weber et al. |
| 5,153,959 | A | | 10/1992 | Fitzsimmons |
| 5,169,363 | A | | 12/1992 | Campanaro et al. |
| 5,181,289 | A | | 1/1993 | Kassai |
| 5,207,628 | A | | 5/1993 | Graham |
| 5,260,870 | A | | 11/1993 | Tsuchiya et al. |
| 5,263,913 | A | | 11/1993 | Boren |
| 5,277,674 | A | | 1/1994 | Tsuchiya et al. |
| 5,279,530 | A | | 1/1994 | Hess |
| 5,312,315 | A | * | 5/1994 | Mortensen ......... A63B 21/0087 482/148 |
| 5,314,390 | A | | 5/1994 | Westing et al. |
| 5,402,544 | A | | 4/1995 | Crawford et al. |
| 5,413,543 | A | | 5/1995 | Drago |
| 5,454,126 | A | | 10/1995 | Foster et al. |
| 5,479,666 | A | | 1/1996 | Foster et al. |
| 5,551,937 | A | | 9/1996 | Kwo |
| 5,577,279 | A | | 11/1996 | Foster et al. |
| 5,601,519 | A | | 2/1997 | Comereski |
| 5,662,591 | A | | 9/1997 | Peindl et al. |
| 5,680,661 | A | | 10/1997 | Foster et al. |
| 5,715,548 | A | | 2/1998 | Weismiller et al. |
| 5,740,571 | A | * | 4/1998 | Tyra ..................... A47C 20/022 5/624 |
| 5,810,698 | A | | 9/1998 | Hullett et al. |
| 5,820,519 | A | | 10/1998 | Slenker |
| 5,827,154 | A | * | 10/1998 | Gill .................... A63B 21/0628 482/135 |
| 5,851,166 | A | | 12/1998 | Bernardson |
| 5,860,941 | A | | 1/1999 | Saringer et al. |
| D405,132 | S | | 2/1999 | Westfall et al. |
| 5,885,197 | A | | 3/1999 | Barton |
| 5,938,571 | A | | 8/1999 | Stevens |
| 5,940,911 | A | | 8/1999 | Wang |
| 5,967,955 | A | | 10/1999 | Westfall et al. |
| 5,967,956 | A | | 10/1999 | Teeter |
| 6,212,714 | B1 | | 4/2001 | Allen et al. |
| 6,226,821 | B1 | | 5/2001 | Heimbrock et al. |
| 6,241,642 | B1 | | 6/2001 | Slenker |
| 6,243,897 | B1 | | 6/2001 | Sumiya |
| 6,270,445 | B1 | | 8/2001 | Dean et al. |
| 6,371,894 | B1 | | 4/2002 | Hill |
| 6,446,287 | B2 | | 9/2002 | Borders |
| 6,464,296 | B2 | | 10/2002 | Sumner |
| 6,611,979 | B2 | | 9/2003 | Welling et al. |
| 6,645,130 | B2 | | 11/2003 | Webber |
| 6,862,762 | B1 | | 3/2005 | Johnson et al. |
| 6,910,236 | B2 | | 6/2005 | Ren |
| 7,181,793 | B2 | | 2/2007 | Lee |
| 7,416,518 | B2 | | 8/2008 | Cardinale |
| 7,426,760 | B2 | | 9/2008 | Vrzalik |
| 7,481,751 | B1 | | 1/2009 | Arnold |
| 7,597,656 | B2 | | 10/2009 | Trees |
| 7,744,546 | B2 | | 6/2010 | Lee |
| 7,874,971 | B2 | | 1/2011 | Reyes |
| 7,883,444 | B1 | | 2/2011 | Wu |
| 7,967,736 | B2 | | 6/2011 | D'Silva et al. |
| 8,012,073 | B2 | | 9/2011 | Barnett |
| 8,104,123 | B2 | | 1/2012 | Paz et al. |
| RE43,155 | E | | 2/2012 | Allen et al. |
| RE43,193 | E | | 2/2012 | Osborne et al. |
| 8,117,695 | B2 | | 2/2012 | Paz et al. |
| 8,249,714 | B1 | * | 8/2012 | Hartman .......... A63B 23/03525 607/48 |
| 8,262,543 | B1 | | 9/2012 | Batca |
| 8,566,984 | B2 | | 10/2013 | Paz et al. |
| 8,640,285 | B2 | | 2/2014 | Heimbrock et al. |
| 8,858,409 | B2 | | 10/2014 | Trees |
| 9,038,218 | B1 | * | 5/2015 | Heil ......................... A61G 7/16 5/618 |
| 9,125,785 | B2 | | 9/2015 | Trees |
| 9,132,051 | B2 | * | 9/2015 | Heil ........................ A61G 7/012 |
| 9,687,401 | B2 | * | 6/2017 | Alford ..................... A61G 7/05 |
| 9,789,354 | B2 | | 10/2017 | Lagree et al. |
| 9,849,330 | B2 | | 12/2017 | Lagree |

(56) References Cited

U.S. PATENT DOCUMENTS 9,884,221 B2 2/2018 Mcjames, II
9,966,997 B2 5/2018 Hayes et al.
10,179,077 B2 * 1/2019 Poulos .................... A61G 7/16
10,188,567 B2 * 1/2019 Wurdeman ............ A61G 7/012
10,188,890 B2 1/2019 Olson et al.
10,252,109 B2 4/2019 Watterson
10,258,828 B2 4/2019 Dalebout et al.
10,272,317 B2 4/2019 Watterson
10,279,207 B2 5/2019 Lagree
10,279,212 B2 5/2019 Dalebout et al.
10,279,214 B2 5/2019 Chiang et al.
10,293,211 B2 5/2019 Watterson et al.
10,300,328 B2 5/2019 Lagree et al.
10,335,338 B2 7/2019 Nichols et al.
10,343,017 B2 7/2019 Jackson
10,361,001 B2 * 7/2019 Darrah .................. A61M 5/168
D855,369 S 8/2019 Newkirk et al.
10,376,736 B2 8/2019 Powell et al.
10,426,989 B2 10/2019 Dalebout
10,426,998 B1 * 10/2019 McRee ................ A63B 21/023
10,433,612 B2 10/2019 Ashby et al.
10,441,840 B2 10/2019 Dalebout
10,441,844 B2 10/2019 Powell
10,449,416 B2 10/2019 Dalebout et al.
10,471,299 B2 11/2019 Powell
10,493,349 B2 12/2019 Watterson
10,500,473 B2 12/2019 Watterson
10,543,395 B2 1/2020 Powell et al.
10,561,894 B2 2/2020 Dalebout et al.
10,625,137 B2 4/2020 Dalebout et al.
10,646,389 B2 * 5/2020 Heil ..................... A61G 7/0514
10,661,114 B2 5/2020 Watterson et al.
10,702,760 B2 7/2020 Lagree et al.
10,729,965 B2 8/2020 Powell
10,744,367 B2 8/2020 Kim
10,797,524 B2 10/2020 Titov et al.
10,857,418 B2 12/2020 Lagree et al.
10,874,567 B2 12/2020 Zerhusen et al.
10,910,888 B2 2/2021 Patmore et al.
10,940,360 B2 3/2021 Dalebout et al.
10,953,305 B2 3/2021 Dalebout et al.
10,974,092 B2 4/2021 Lagree et al.
11,013,646 B2 5/2021 Carletti
11,446,191 B2 * 9/2022 Zerhusen ............. A61G 7/0524
11,452,650 B2 * 9/2022 Heil ....................... A61G 7/008
11,666,792 B2 * 6/2023 Lagree ............... A63B 21/4047
482/142
11,673,017 B2 * 6/2023 Konopacz .......... A63B 21/4034
482/130
2001/0001163 A1 5/2001 Allen et al.
2004/0009857 A1 1/2004 Webb et al.
2004/0043876 A1 3/2004 Craciunescu
2004/0221391 A1 11/2004 Allen et al.
2007/0157376 A1 7/2007 Paz et al.
2007/0180621 A1 8/2007 Turner et al.
2007/0203434 A1 8/2007 Namgung et al.
2008/0045384 A1 2/2008 Matsubara et al.
2008/0289108 A1 11/2008 Menkedick et al.
2009/0031498 A1 2/2009 Girard et al.
2009/0137369 A1 5/2009 Branch et al.
2010/0005591 A1 1/2010 Manouchehri
2010/0234198 A1 9/2010 Thulin
2010/0248917 A1 9/2010 Reyes
2010/0313358 A1 12/2010 Poyet
2010/0313897 A1 12/2010 Schaeffer
2010/0323857 A1 12/2010 D'Silva et al.
2011/0004996 A1 1/2011 Ryou et al.
2011/0077127 A1 * 3/2011 Ishii .................. A63B 21/0058
482/8
2011/0082006 A1 4/2011 Ishii et al.
2011/0092339 A1 4/2011 Stewart
2011/0143898 A1 * 6/2011 Trees ..................... A61G 7/005
482/142
2011/0231997 A1 9/2011 Turner et al.
2011/0251022 A1 10/2011 Lee
2012/0066832 A1 3/2012 Poulos et al.
2012/0073053 A1 3/2012 Turner et al.
2012/0079655 A1 4/2012 Tekulve
2012/0117730 A1 5/2012 Lemire et al.
2012/0232438 A1 * 9/2012 Cataldi ............. A63B 21/4045
601/5
2013/0139318 A1 * 6/2013 Paz ........................ A61G 7/108
5/624
2014/0296044 A1 10/2014 Kucharski
2015/0115638 A1 4/2015 Lambarth et al.
2015/0196442 A1 * 7/2015 Heil ....................... A61G 7/012
5/613
2015/0216749 A1 * 8/2015 Heil ..................... A61G 7/0506
5/613
2015/0290061 A1 * 10/2015 Stafford ............. A63B 22/0089
5/600
2015/0343250 A1 12/2015 Lagree et al.
2015/0360068 A1 12/2015 Lagree
2016/0193095 A1 * 7/2016 Roussy ................ A61G 7/0507
5/616
2016/0375298 A1 12/2016 Crowley et al.
2017/0079733 A1 3/2017 Darrah et al.
2017/0106232 A1 4/2017 Lagree et al.
2017/0112704 A1 4/2017 Chong
2017/0293281 A1 10/2017 Li et al.
2018/0049936 A1 2/2018 Shokoufandeh
2018/0117388 A1 5/2018 Porter et al.
2018/0161225 A1 * 6/2018 Zerhusen ................. A61G 7/05
2020/0230001 A1 * 7/2020 Heil ......................... A61G 7/16
2021/0106479 A1 * 4/2021 Zerhusen ............... A61H 1/024
2022/0183907 A1 * 6/2022 Liu ........................ A61G 7/053

FOREIGN PATENT DOCUMENTS

CN 205286776 U 6/2016
CN 104921892 B 12/2017
CN 108324506 A 7/2018

* cited by examiner

PATIENT BED HAVING ACTIVE MOTION EXERCISE

CROSS-REFERENCE TO RELATED APPLICATIONS

This application claims priority under 35 U.S.C. § 119(e) to U.S. Provisional Application No. 63/012,481, filed Apr. 20, 2020, and U.S. Provisional Application No. 63/071,046, filed Aug. 27, 2020, both of which are expressly incorporated by reference herein.

BACKGROUND

The present disclosure relates to a patent support apparatus, and more particularly, to a patient support apparatus that enables a patient to exercise the patient's legs while seated in the patient support apparatus.

Often, the time period of bed rest required for recovery from an illness or serious injury leads to severe deterioration of muscle strength and a corresponding inability of the patient to support full body weight upon standing. It is challenging for rehabilitation specialists to help these patients regain the ability to stand and begin ambulation. The challenge is especially great for obese patients. A common technique in conventional practice is to physically lift and maneuver the weakened patient to a standing position while he or she attempts to bear full weight through the lower extremities. This technique has the possibility of increasing the risk of a patient fall and is also psychologically degrading for the patient as the activity reinforces the patient's dependence on others.

Hospital beds have evolved from conventional beds that lie flat to beds that convert into a chair position, allowing patients to begin standing from the foot of the bed. However, the sitting position does not improve a patient's leg strength and does little for preparing a patient for upright standing. Patients are still required to be lifted by hospital staff as the patient's leg muscles do not have adequate strength to support their weight.

SUMMARY

The present disclosure includes one or more of the features recited in the appended claims and/or the following features which, alone or in any combination, may comprise patentable subject matter.

According to a first aspect of the disclosed embodiments, a patient support apparatus may include a frame. An articulated deck may be coupled to the frame. The articulated deck may include a head section, a seat section, a thigh section, and a foot section. The seat section may include a stationary frame coupled to the frame and a moveable frame that is moveable relative to the stationary frame. The moveable frame may be moveable between a retracted position in which the moveable frame of the seat section is positioned adjacent the thigh section, and an extended position in which the moveable frame of the seat section is separated away from the thigh section, so that a patient positioned on the patient support apparatus is enabled to exercise by moving the moveable frame between the retracted position and the extended position.

In some embodiments of the first aspect, the moveable frame may be moveable within a range of 1 inch to 12 inches relative to the stationary frame. The moveable frame of the seat section may be locked from being moveable relative to the stationary frame unless the head section is pivotably raised upwardly beyond a threshold angle. The moveable frame of the seat section may be locked from being moveable relative to the stationary frame unless the foot section is moved to a retracted foot section position. The moveable frame of the seat section may be locked from being moveable relative to the stationary frame unless a foot rest is positioned between the foot section and the patient. The moveable frame of the seat section may be locked from being moveable relative to the stationary frame unless the articulated deck is tilted to a predetermined angle. The predetermined angle may be between 1 degree and 20 degrees. The moveable frame of the seat section may be locked from being moveable relative to the stationary frame unless one or more casters coupled to the frame are braked. The moveable frame of the seat section may be locked from being moveable relative to the stationary frame unless at least one siderail coupled to the frame is in a raised position. The at least one siderail may include a first siderail adjacent a right side of the frame and a second siderail adjacent a left side of the frame. The moveable frame of the seat section may be locked from being moveable relative to the stationary frame unless the first and second siderails are both in the raised position.

Optionally, in the first aspect, an actuator may be moveable between a locking position and an unlocking position. The moveable frame may be unlocked for movement relative to the stationary frame in response to the actuator being moved to the unlocking position. After the exercise is finished, the actuator may return to the locking position thereby returning the moveable frame to the retracted position.

It may be desired that, in the first aspect, the seat section may include a pair of panels. A first panel of the pair of panels may be coupled to the moveable frame to move therewith and a second panel of the pair of panels may be coupled to the stationary frame. The first panel may include at least one flange and the second panel may be adjacent the flange. The at least one flange may include a pair of flanges and the sides of the second panel may be adjacent respective flanges of the pair of flanges. When the moveable frame is in the extended position, the second panel may extend across a gap formed between the first panel and the thigh section.

It may be contemplated that, in the first aspect, the frame may include at least one track. The moveable frame may move along the track when the moveable frame moves between the retracted position and the extended position. The frame may include a first track oriented in a first direction and a second track oriented in a second direction. The orientation of the first track may be 90 degrees relative to the orientation of the second track. The moveable frame may move along the first track and the second track when the moveable frame moves between the retracted position and the extended position.

In some embodiments of the first aspect, the head section may be pivotably coupled to the moveable frame of the seat section. A lower end of the head section may be coupled to the moveable frame by a pivot joint that translates along the moveable frame as the head section is pivotably raised and lowered. The head section may be pivotable relative to the moveable frame regardless of whether the moveable frame is in the retracted position, the extended position, or any position between the retracted and extended positions. The head section may be locked out from pivoting relative to the moveable frame unless the moveable frame is in the retracted position.

According to a second aspect of the disclosed embodiments, a patient support apparatus may include a frame. An articulated deck may be coupled to the frame. The articulated deck may include a head section, a seat section, a thigh section, and a foot section. The seat section may include a stationary frame coupled to the frame and a moveable frame that is moveable relative to the stationary frame. An actuator may have a fixed member coupled to the frame and a moveable member that is telescopically moveable relative to the fixed member between a locking position and an unlocking position. The moveable member may be extended relative to the fixed member when in the unlocking position and the moveable member may be retracted relative to the fixed member when in the locking position. When the moveable member is moved to the unlocking position, the moveable frame may be unlocked for movement relative to the stationary frame between a retracted position in which the moveable frame of the seat section is positioned adjacent the thigh section, and an extended position in which the seat section is separated from the thigh section, so that a patient positioned on the patient support apparatus is capable of exercising by moving the moveable frame between the retracted position and the extended position. As the actuator returns the moveable member to the locking position, the moveable frame of the seat section may return to the retracted position adjacent the thigh section.

In some embodiments of the second aspect, the moveable frame may be moveable within a range of 1 inch to 12 inches relative to the stationary frame. The moveable member of the actuator may be maintained in the locked condition unless the head section is pivotably raised upwardly beyond a threshold angle. The moveable member of the actuator may be maintained in the locked condition unless the foot section is moved to a retracted foot section position. The moveable member of the actuator may be maintained in the locked condition unless a foot rest is positioned between the foot section and the patient. The moveable member of the actuator may be maintained in the locked condition unless the articulated deck is tilted to a predetermined angle. The predetermined angle may be between 1 degree and 20 degrees. The moveable member of the actuator may be maintained in the locked condition unless one or more casters coupled to the frame are braked. The moveable member of the actuator may be maintained in the locked condition unless at least one siderail coupled to the frame is in a raised position. The at least one siderail may include a first siderail adjacent a right side of the frame and a second siderail adjacent a left side of the frame. The moveable member of the actuator may be maintained in the locked condition unless the first and second siderails are both in the raised position.

Optionally, in the second aspect, the seat section may include a pair of panels. A first panel of the pair of panels may be coupled to the moveable frame to move therewith and a second panel of the pair of panels may be coupled to the stationary frame. The first panel may include a flange and the second panel may be adjacent the flange. The first panel may include a pair of flanges and the sides of the second panel may be adjacent respective flanges of the pair of flanges. When the moveable member of the actuator is in the extended position, the moveable frame of the seat section may be moved to the extended position. The second panel may extend across a gap formed between the first panel and the thigh section.

It may be desired that, in the second aspect, the frame may include at least one track. The moveable frame may move along the track when the moveable frame moves between the retracted position and the extended position. The frame may include a first track oriented in a first direction and a second track oriented in a second direction. The orientation of the first track may be 90 degrees relative to the orientation of the second track. The moveable frame may move along the first track and the second track when the moveable frame moves between the retracted position and the extended position.

It may be contemplated that, in the second aspect, the head section may be pivotably coupled to the moveable frame of the seat section. A lower end of the head section may be coupled to the moveable frame by a pivot joint that translates along the moveable frame as the head section is pivotably raised and lowered. The head section may be pivotable relative to the moveable frame regardless of whether the moveable member of the actuator is in the locking position, the unlocking position, or any position between the locking position and the unlocking positions. The head section may be locked out from pivoting relative to the moveable frame unless the moveable member of the actuator is in the locking position.

According to a third aspect of the disclosed embodiments, a patient support apparatus may include a frame. An articulated deck may be coupled to the frame. The articulated deck may include a head section, a seat section, a thigh section, and a foot section. The seat section may include a stationary frame coupled to the frame and a moveable frame that is moveable relative to the stationary frame. The seat section may further include a lower panel coupled to the stationary frame and an upper panel coupled to the moveable frame. The upper panel may move with the moveable frame relative to the lower panel. The moveable frame may be moveable between a retracted position in which the moveable frame of the seat section is positioned adjacent the thigh section, and an extended position in which the moveable frame of the seat section is separated away from the thigh section, so that a patient positioned on the patient support apparatus is capable of exercising by moving the moveable frame between the retracted position and the extended position. In the extended position, the lower panel may extend across a gap formed between the seat section and the thigh section.

In some embodiments of the third aspect, the moveable frame may be moveable within a range of 1 inch to 12 inches relative to the stationary frame. The moveable frame of the seat section may be locked from being moveable relative to the stationary frame unless the head section is pivotably raised upwardly beyond a threshold angle. The moveable frame of the seat section may be locked from being moveable relative to the stationary frame unless the foot section is moved to a retracted foot section position. The moveable frame of the seat section may be locked from being moveable relative to the stationary frame unless a foot rest is positioned between the foot section and the patient. The moveable frame of the seat section may be locked from being moveable relative to the stationary frame unless the articulated deck is tilted to a predetermined angle. The predetermined angle may be between 1 degree and 20 degrees. The moveable frame of the seat section may be locked from being moveable relative to the stationary frame unless one or more casters coupled to the frame are braked. The moveable frame of the seat section may be locked from being moveable relative to the stationary frame unless at least one siderail coupled to the frame is in a raised position. The at least one siderail may include a first siderail adjacent a right side of the frame and a second siderail adjacent a left side of the frame. The moveable frame of the seat section may be locked from being moveable relative to the stationary frame unless the first and second siderails are both in the raised position.

In some embodiments of the third aspect, an actuator may be moveable between a locking position and an unlocking position. The moveable frame may be unlocked for movement relative to the stationary frame after the actuator is moved to the unlocking position. After the exercise is finished, the actuator may return to the locking position to return the moveable frame to the retracted position.

Optionally, in the third aspect, the first panel may include at least one flange and the second panel may be adjacent the at least one flange. The at least one flange may include a pair of flanges and the sides of the second panel may be adjacent respective flanges of the pair of flanges.

It may be contemplated that, in the third aspect, the frame may include at least one track. The moveable frame may move along the track when the moveable frame moves between the retracted position and the extended position. The frame may include a first track oriented in a first direction and a second track oriented in a second direction. The orientation of the first track may be 90 degrees relative to the orientation of the second track. The moveable frame may move along the first track and the second track when the moveable frame moves between the retracted position and the extended position.

It may be desired that, in the third aspect, the head section may be pivotably coupled to the moveable frame of the seat section. A lower end of the head section may be coupled to the moveable frame by a pivot joint that translates along the moveable frame as the head section is pivotably raised and lowered. The head section may be pivotable relative to the moveable frame regardless of whether the moveable frame is in the retracted position, the extended position, or any position between the retracted and extended positions. The head section may be locked out from pivoting relative to the moveable frame unless the moveable frame is in the retracted position.

According to a fourth aspect of the disclosed embodiments, a patient support apparatus may include a frame, the frame may include a horizontal track and a vertical track. An articulated deck may be coupled to the frame. The articulated deck may include a head section, a seat section, a thigh section, and a foot section. The seat section may include a stationary frame coupled to the frame and a moveable frame that is moveable relative to the stationary frame. The moveable frame may include a first roller that moves along the horizontal track and a second roller that moves along the vertical track when the moveable frame moves relative to the stationary frame. The moveable frame may be moveable between a retracted position in which the moveable frame of the seat section is positioned adjacent the thigh section, and an extended position in which the moveable frame of the seat section is separated from the thigh section, so that a patient positioned on the patient support apparatus is capable of exercising by moving the moveable frame between the retracted position and the extended position. The orientation of the horizontal track may be 90 degrees relative to the orientation of the vertical track.

In some embodiments of the fourth aspect, the moveable frame may be moveable within a range of 1 inch to 12 inches relative to the stationary frame. The moveable frame of the seat section may be locked from being moveable relative to the stationary frame unless the head section is pivotably raised upwardly beyond a threshold angle. The moveable frame of the seat section may be locked from being moveable relative to the stationary frame unless the foot section is moved to a retracted foot section position. The moveable frame of the seat section may be locked from being moveable relative to the stationary frame unless a foot rest is positioned between the foot section and the patient. The moveable frame of the seat section may be locked from being moveable relative to the stationary frame unless the articulated deck is tilted to a predetermined angle. The predetermined angle may be between 1 degree and 20 degrees. The moveable frame of the seat section may be locked from being moveable relative to the stationary frame unless one or more casters coupled to the frame are braked. The moveable frame of the seat section may be locked from being moveable relative to the stationary frame unless at least one siderail coupled to the frame is in a raised position. The at least one siderail may include a first siderail adjacent a right side of the frame and a second siderail adjacent a left side of the frame. The moveable frame of the seat section may be locked from being moveable relative to the stationary frame unless the first and second siderails are both in the raised position.

Optionally, in the fourth aspect, an actuator may be moveable between a locking position and an unlocking position. The moveable frame may be unlocked for movement relative to the stationary frame after the actuator is moved to the unlocking position. After the exercise is finished, the actuator may return to the locking position to return the moveable frame to the retracted position.

It may be contemplated that, in the fourth aspect, the seat section may include a pair of panels. A first panel of the pair of panels may be coupled to the moveable frame to move therewith and a second panel of the pair of panels may be coupled to the stationary frame. The first panel may include at least one flange and the second panel may be adjacent the flange. The at least one flange may include a pair of flanges and the sides of the second panel may be adjacent respective flanges of the pair of flanges. When the moveable frame is in the extended position, the second panel may extend across a gap formed between the first panel and the thigh section.

It may be desired that, in the fourth aspect, the head section may be pivotably coupled to the moveable frame of the seat section. A lower end of the head section may be coupled to the moveable frame by a pivot joint that translates along the moveable frame as the head section is pivotably raised and lowered. The head section may be pivotable relative to the moveable frame regardless of whether the moveable frame is in the retracted position, the extended position, or any position between the retracted and extended positions. The head section may be locked out from pivoting relative to the moveable frame unless the moveable frame is in the retracted position.

According to a fifth aspect of the disclosed embodiments, a patient support apparatus may include a frame and an articulated deck coupled to the frame. The articulated deck may include a head section, a seat section, a thigh section, and a foot section. The seat section may include a stationary frame coupled to the frame and a moveable frame that is moveable relative to the stationary frame. The moveable frame may be moveable between a retracted position in which the moveable frame of the seat section is positioned adjacent the thigh section, and an extended position in which the moveable frame of the seat section is separated away from the thigh section, so that a patient positioned on the patient support apparatus is enabled to exercise by moving the moveable frame between the retracted position and the extended position. A cardiopulmonary resuscitation (CPR) homing link may be coupled between the head section and the frame. The CPR homing link may be configured to guide lowering of the head section relative to the frame in response to an emergency CPR function being activated to permit the head section to lower rapidly from a raised position. The CPR homing link may be further configured to move the moveable frame to the retracted position as the head section lowers after the emergency CPR function is activated.

In some embodiments of the fifth aspect, the frame may include a channel. A first end of the CPR homing link may be pivotably coupled to the head section. A second end of the CPR homing link may move along the channel during movement of the head section between the raised position and an intermediate position. A roller may be coupled to the second end of the CPR homing link and rolling in the channel as the head section moves between the raised position and the intermediate position. A stop may be situated in the channel. The roller may engage the stop when the head section reaches the intermediate position during downward movement of the head section to prevent the second end of the CPR homing link from moving along the channel during further downward movement of the head section from the intermediate position to a lowered position. The stop may include a curved surface against which a substantially cylindrical outer perimeter of the roller nests when the roller engages the stop. Engagement of the roller with the stop may result in the CPR homing link acting through the head section to push the moveable frame back into the retracted position during downward movement of the head section from the intermediate position to the lowered position. An axle may interconnect the second end of the CPR homing link and the roller. The axle may define a pivot axis about which the CPR homing link pivots as the head section moves between the raised and lowered positions. The frame may include a channel member that extends along a longitudinal dimension of the frame, the channel member defining the channel. The head section may be angled relative to the channel member by about 30 degrees when the head section reaches the intermediate position.

Optionally, in the fifth aspect, a manual CPR input may be moved manually to activate the emergency CPR function. The manual CPR input may include at least one of a handle, a lever, or a pedal. The frame may include a base frame and an upper frame supported above the base frame by a lift. The manual CPR input may be coupled to the base frame and may be configured for actuation by a user's foot. The manual CPR input may be coupled to the head section. The manual CPR input may be coupled to the upper frame.

In some embodiments of the fifth aspect, a rotating link may couple the head section to the moveable frame. A spacing between a lower end of the rotating link and a lower end of the CPR homing link may increase as the head section lowers from the raised position to a lowered position. The CPR homing link may be coupled to the head section at a first pivot joint. The rotating link may be coupled to the head section at a second pivot joint. A distance between the first and second pivot joints may remain constant as the head section moves between the raised and lowered positions. The rotating link may be shorter than the CPR homing link. A head end siderail connection bracket may be attached to the head section. The CPR homing link may nest behind the head end siderail connection bracket when the head section is lowered.

It may be desired, in the fifth aspect, that an actuator may be moveable between a locking position and an unlocking position. The moveable frame may be unlocked for movement relative to the stationary frame in response to the actuator being moved to the unlocking position. The actuator may be moved to the locking position in response to the emergency CPR function being activated. The moveable frame may be unlocked for movement relative to the stationary frame in response to the actuator being moved to the unlocking position. The actuator may remain in the unlocking position after the emergency CPR function is activated. The seat section may include a pair of panels. A first panel of the pair of panels may be coupled to the moveable frame to move therewith and a second panel of the pair of panels may be coupled to the stationary frame. In response to the emergency CPR function being activated, the second panel may move into a position above the first panel.

In any of the aspects described above, a cardiopulmonary resuscitation (CPR) homing link may be coupled between the head section and the frame. The CPR homing link may be configured to guide lowering of the head section relative to the frame in response to an emergency CPR function being activated. A manual CPR input may be moved manually to activate the emergency CPR function.

Additional features, which alone or in combination with any other feature(s), such as those listed above and those listed in the claims, may comprise patentable subject matter and will become apparent to those skilled in the art upon consideration of the following detailed description of various embodiments exemplifying the best mode of carrying out the embodiments as presently perceived.

BRIEF DESCRIPTION OF THE DRAWINGS

The detailed description particularly refers to the accompanying figures in which.

DETAILED DESCRIPTION

Figure 1:
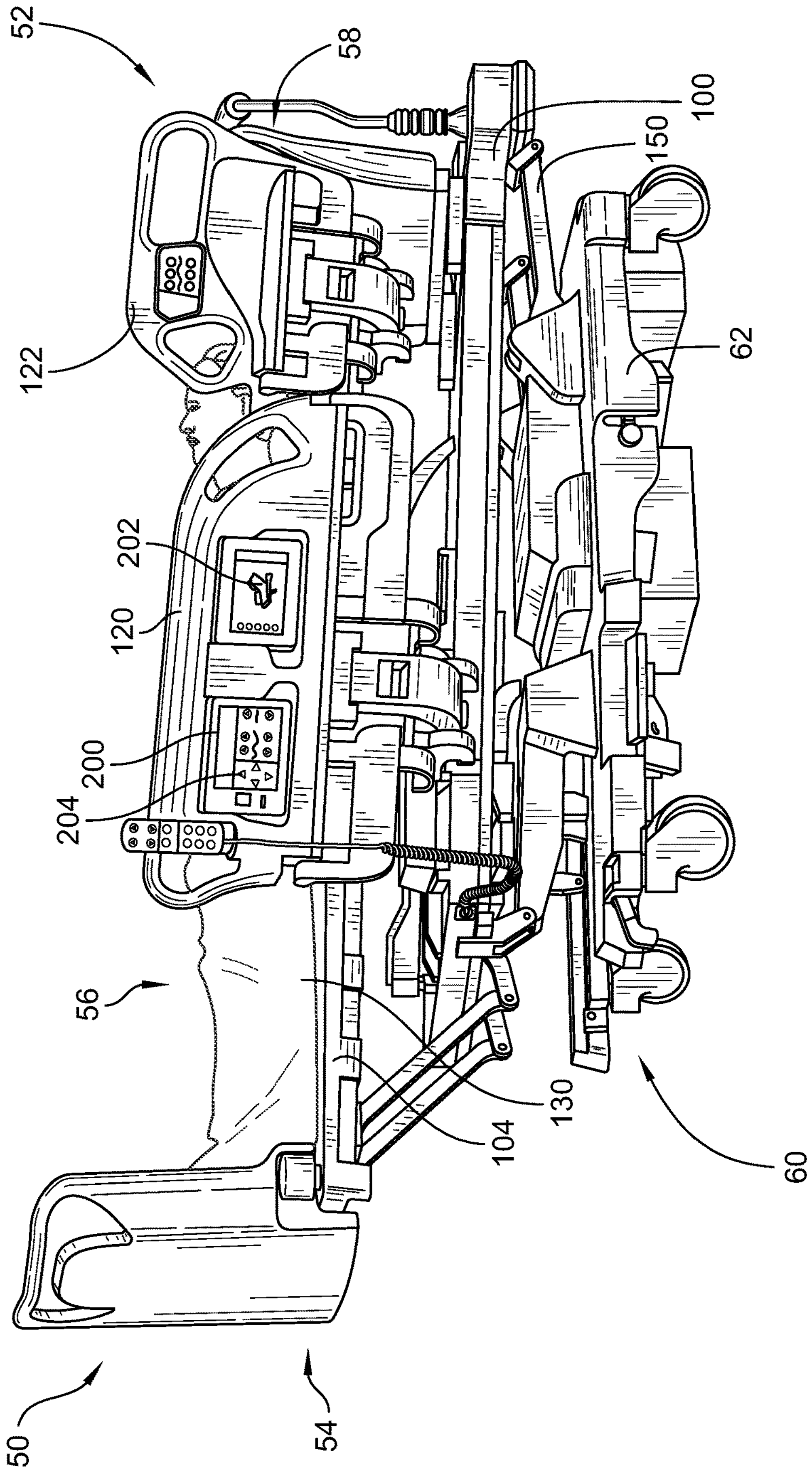
FIG. 1 PRIOR ART
FIG. 1 is a side perspective view of a patient support apparatus in accordance with an embodiment and embodied as a hospital bed having a frame with a headboard, footboard, and side rails coupled to the frame.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Referring to FIG. 1, a patient support apparatus 50 in accordance with the present disclosure includes a head end 52, a foot end 54, and sides 56, 58. As used in this description, the phrase "head end 52" will be used to denote the end of any referred-to object that is positioned to lie nearest head end 52 of patient support apparatus 50. Likewise, the phrase "foot end 54" will be used to denote the end of any referred-to object that is positioned to lie nearest foot end 54 of patient support apparatus 50.

Patient support apparatus 50 includes a base 60 having a base frame 62 connected to an intermediate frame 100. An articulated deck 104 is coupled to intermediate frame 100. Right siderails 110, 112 (shown in FIGS. 2 and 3) and left siderails 120, 122 are coupled to and extend from frame 62. A mattress 130 is carried by the articulated deck 104 and provides a sleeping surface or support surface 132 configured to receive a patient (not shown).

Figure 2:
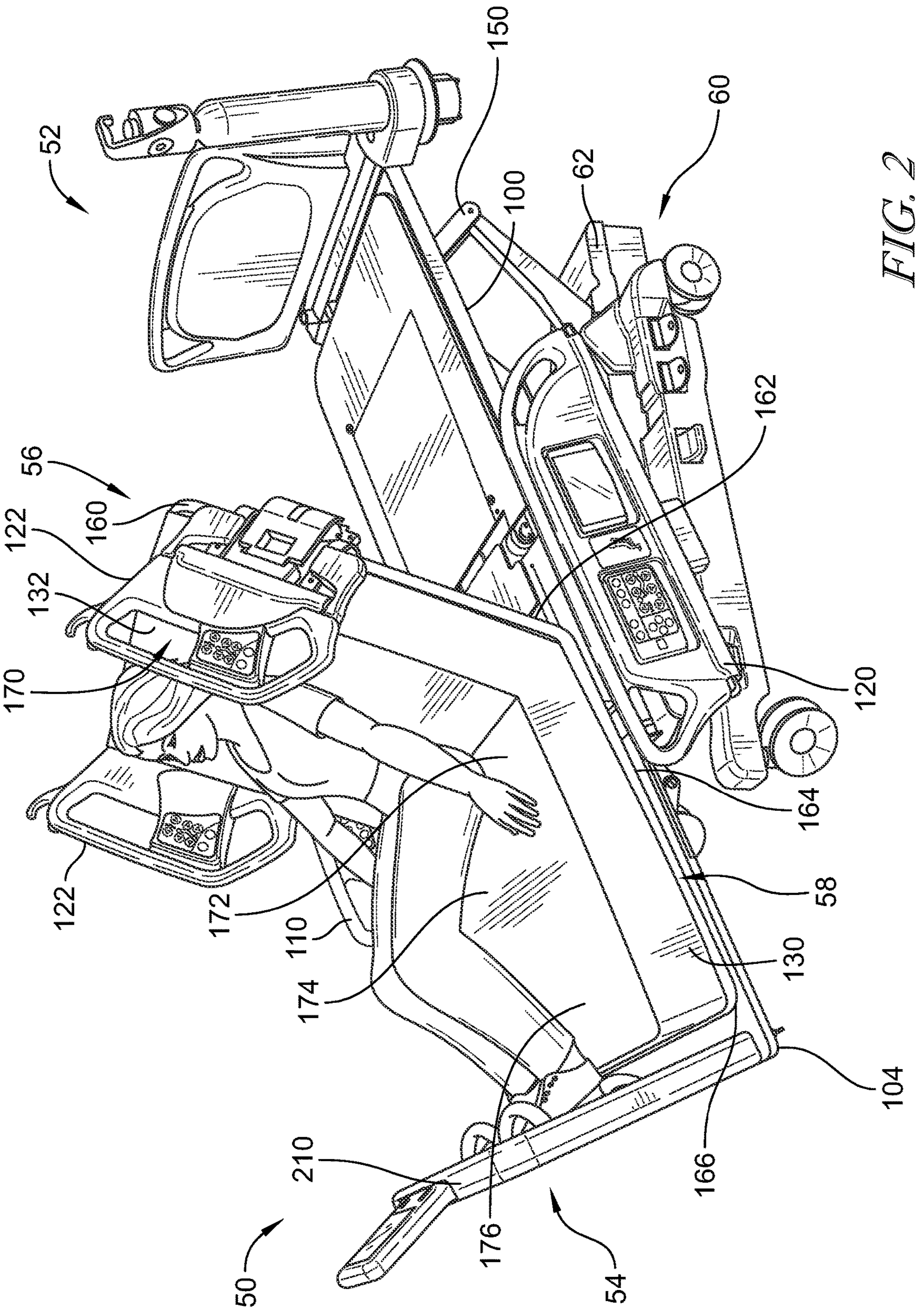
FIG. 2 PRIOR ART
FIG. 2 is a side perspective view of a patient exercising in the patient support apparatus in a retracted position.
Figure 3:
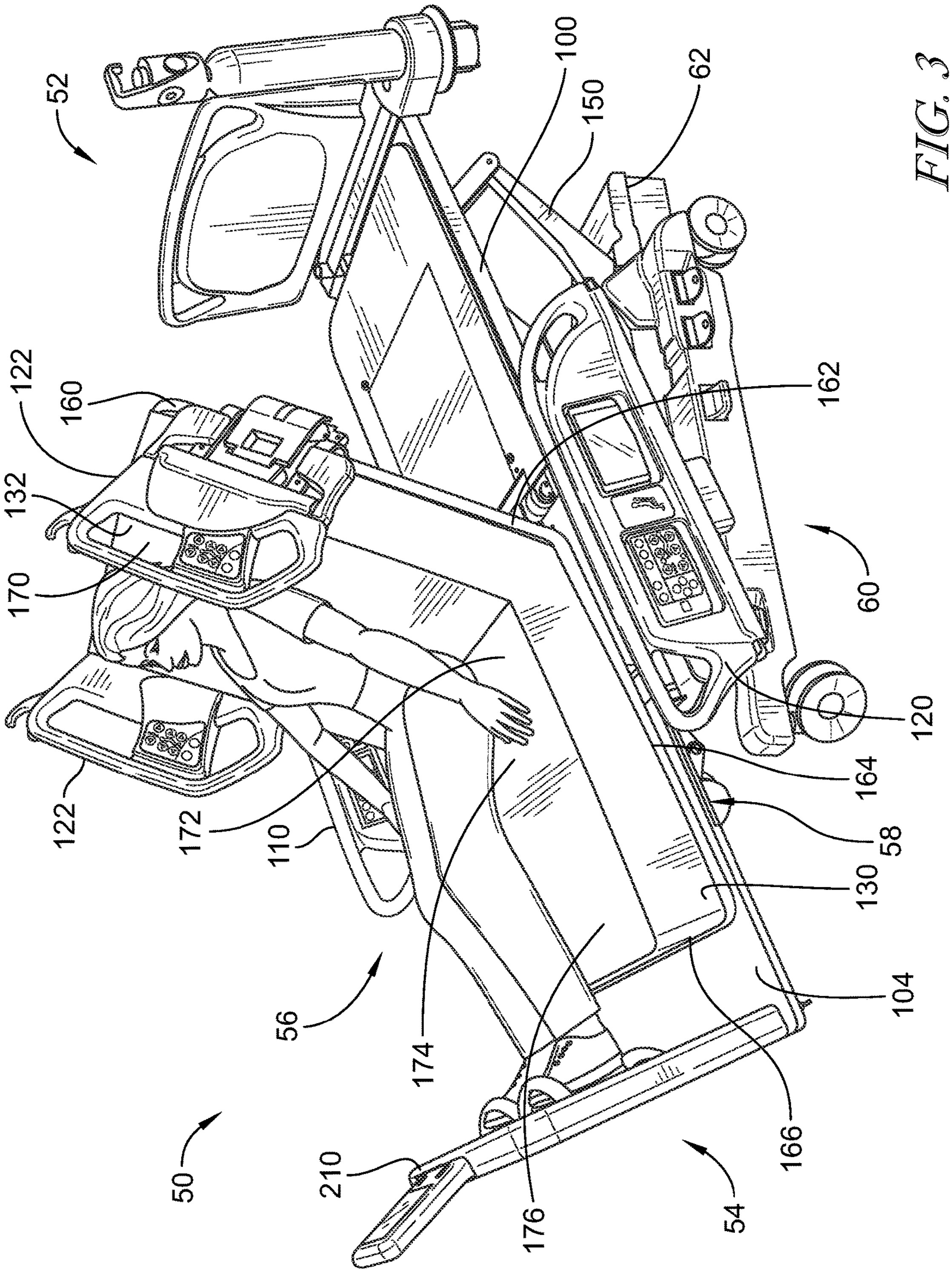
FIG. 3 PRIOR ART
FIG. 3 is a side perspective view of a patient exercising in the patient support apparatus in an extended position.

The articulated deck 104 includes a head section 160, a seat section 162, a thigh section 164, and a foot section 166 (shown in FIGS. 2 and 3). The mattress 130 rests on the articulated deck 104 and includes a head portion 170, a seat portion 172, a thigh portion 174, and a foot portion 176 (shown in FIGS. 2 and 3), each of which generally corresponds to the like-named portions of the articulated deck 104, and each of which is generally associated with the head, seat, thighs, and feet of the patient on sleeping surface 132.

The patient support apparatus 50 can be manipulated by a caregiver or by the patient on the sleeping surface 132 using electric linear actuators 150 so that the mattress 130, the intermediate frame 100, and the articulated deck 104 assume a variety of positions. The patient support apparatus 50 can assume a bed position having the articulated deck 104 configured so that the sleeping surface 132 is generally planar and horizontal, defining an initial position of the articulated deck 104, as shown in FIG. 1. The patient support apparatus 50 is convertible to a sitting position, shown in FIG. 2. In the sitting position, the head end 52 of the head section 160 of the articulated deck 104 is pivoted upwardly away from the intermediate frame 100 to a back-support position providing a pivotable backrest so that the head section 160 and the intermediate frame 100 form an angle generally between 55 and 90 degrees. Furthermore, in the sitting position of the patient support apparatus 50, the seat section 162 of the articulated deck 104 is positioned to lie generally horizontally, the foot end 54 of the thigh section 164 is slightly upwardly inclined, and the foot section 166 of articulated deck 102 extends generally vertically downwardly from the thigh section 164.

The patient support apparatus 50 can be moved to a Trendelenburg position (not shown) having the articulated deck tilted so that the head end 52 of the sleeping surface 132 is positioned to lie closer to the floor than the foot end 54 of the sleeping surface 132. The patient support apparatus 50 can also achieve a reverse-Trendelenburg position, shown in FIG. 3, having the articulated deck 104 tilted so that the foot end 54 of the sleeping surface 132 is positioned to lie closer to the floor than the head end 52 of the sleeping surface 132.

A control panel 200 is positioned on the left siderail 120 in the illustrative embodiment. The control panel 200 includes a display 202 and a plurality of user inputs 204. The user inputs 204 are selected by a user, such as a caregiver, to move the apparatus 50 between the positions described above. The display 202 displays information relevant to the position of the apparatus 50. For example, the display 202 may display an angle of one of the apparatus sections, a position of the apparatus 50 (i.e. seated, bed, Trendelenburg, reverse-Trendelenburg, etc.). The user inputs 204 are also selected to implement an exercise regimen for the patient. In some embodiments, the caregiver or patient may enter data related to the exercise regimen. For example, the caregiver or patient may enter a number of required repetitions or a time period for the exercise regimen.

Referring now to FIGS. 2 and 3, a prior art method of exercising on the apparatus 50 is shown. The apparatus 50 is positioned for a patient to perform an exercise regimen. In such a configuration, the apparatus is placed in reverse-Trendelenburg position with the head end 52 of the head section 160 of the articulated deck 104 pivoted upwardly away from the intermediate frame 100. The patient is positioned in a seated position with the patient's feet placed against a footboard 210 at the foot end 54 of the apparatus 50. The legs of the patient are bent so that the patient can press against the footboard 210, as shown in FIG. 2. As the patient presses against the footboard 210 and the patient's legs extend or straighten, the articulated deck 104 slides backward, as shown in FIG. 3. The patient then bends the patient's knees which permits the articulated deck 104 to retract back to the position shown in FIG. 2. By retracting and extending the legs between the bent and straightened positions shown in FIGS. 2 and 3, respectively, the patient exercises the patient's legs. The amount of weight pressed by the patient, is determined by a weight of the patient, a weight of the articulated deck 104 being moved, and an angle at which the articulated deck 104 is tilted. It should be appreciated that articulated deck 104 tilts with the intermediate frame 100 and therefore, the angle of tilt of the intermediate frame 100 relative to the base frame 62, or relative to horizontal, is considered to be the angle of tilt of the articulated deck 104.

Figure 4:
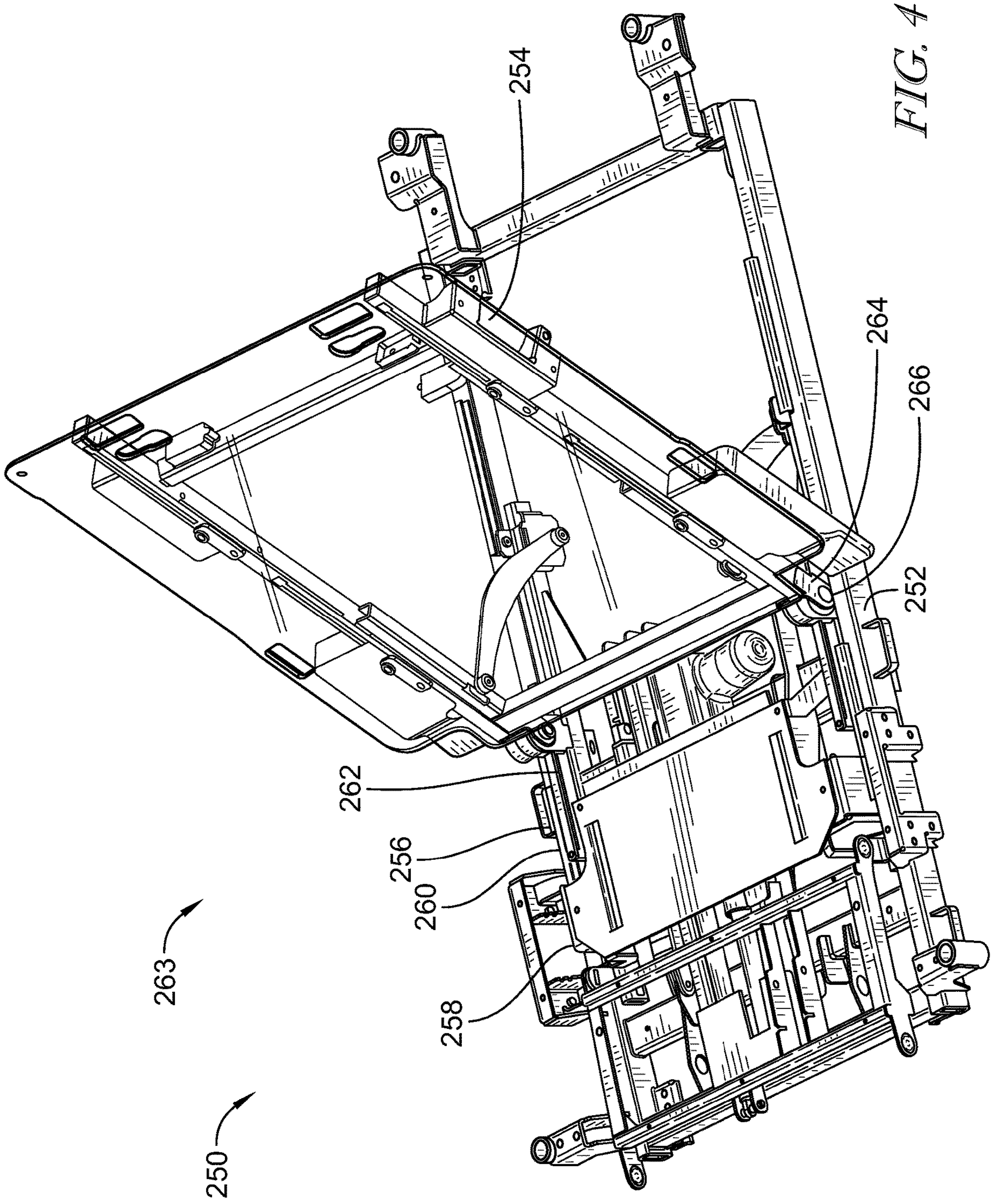
FIG. 4 is a side perspective view of an articulated deck in accordance with an embodiment and in a retracted position.

FIG. 4 shows an articulated deck 250 that may be used with the apparatus 50 in lieu of articulated deck 104. The articulated deck 250 is mounted to a frame 252 that is used in apparatus 50 in lieu of intermediate frame 100. The articulated deck 250 includes a head section 254, a seat section 256, and a thigh section 258 that are coupled to the frame 252. The articulated deck 250 also includes a foot section 259 as shown in FIGS. 12-18. The head section 254 is moveable between a raised position (shown in FIG. 4) and a lowered position (not shown, but corresponding to apparatus 50 being in the bed position as shown in FIG. 1). The head section 254 is raised for the patient to perform an exercise regimen. The seat section 256 includes a stationary frame 260 fixedly attached to the frame 252 and a moveable frame 262 that moves relative to the stationary frame 260. The head section 254 is coupled to the moveable frame 262 and moves with the moveable frame 262. A lower end 164 of the head section 254 includes a pivot joint 266 that couples the head section 154 to the moveable frame 262. The pivot joint 266 translates along the moveable frame 262 as the head section 154 is raised and lowered relative to the stationary frame 260.

Figure 5:
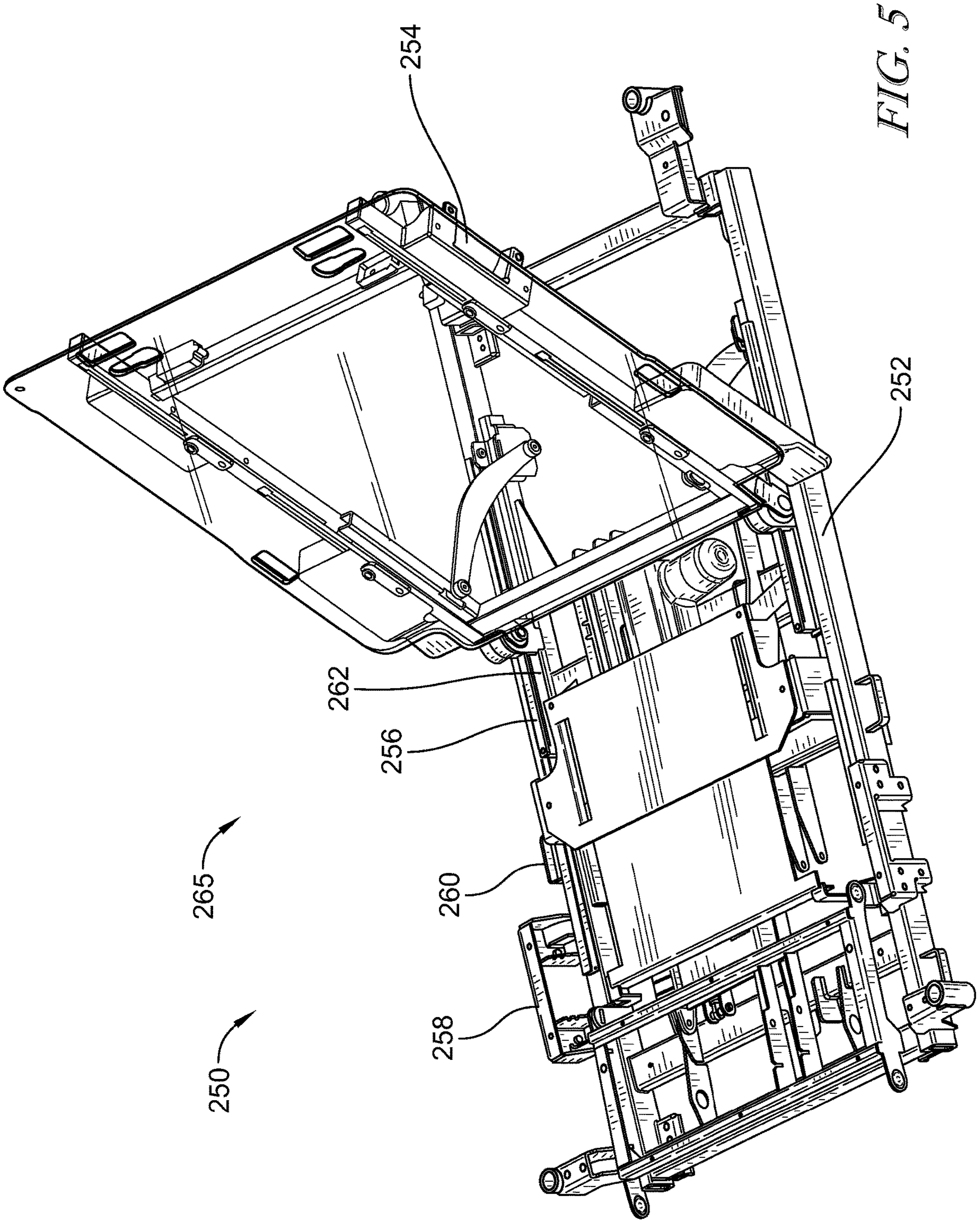
FIG. 5 is a side perspective view of the articulated deck shown in FIG. 4 and in an extended position.

The moveable frame 262 moves between a retracted position 263 (shown in FIG. 4) and an extended position 265 (shown in FIG. 5). In the extended position 265, the moveable frame 262 is separated from the thigh section 258. Accordingly, during the exercise regimen, the moveable frame 262 of the seat section 256 moves relative to the thigh section 258 from the retracted position 263 in which the seat section 256 is positioned next to, or adjacent to, the thigh section 258, and the extended position 265 in which the seat section 256 is positioned away from the thigh section 258. Notably, the head section 254 moves with the seat section 256 between the extended position 265 and the retracted position 263.

Figure 6:
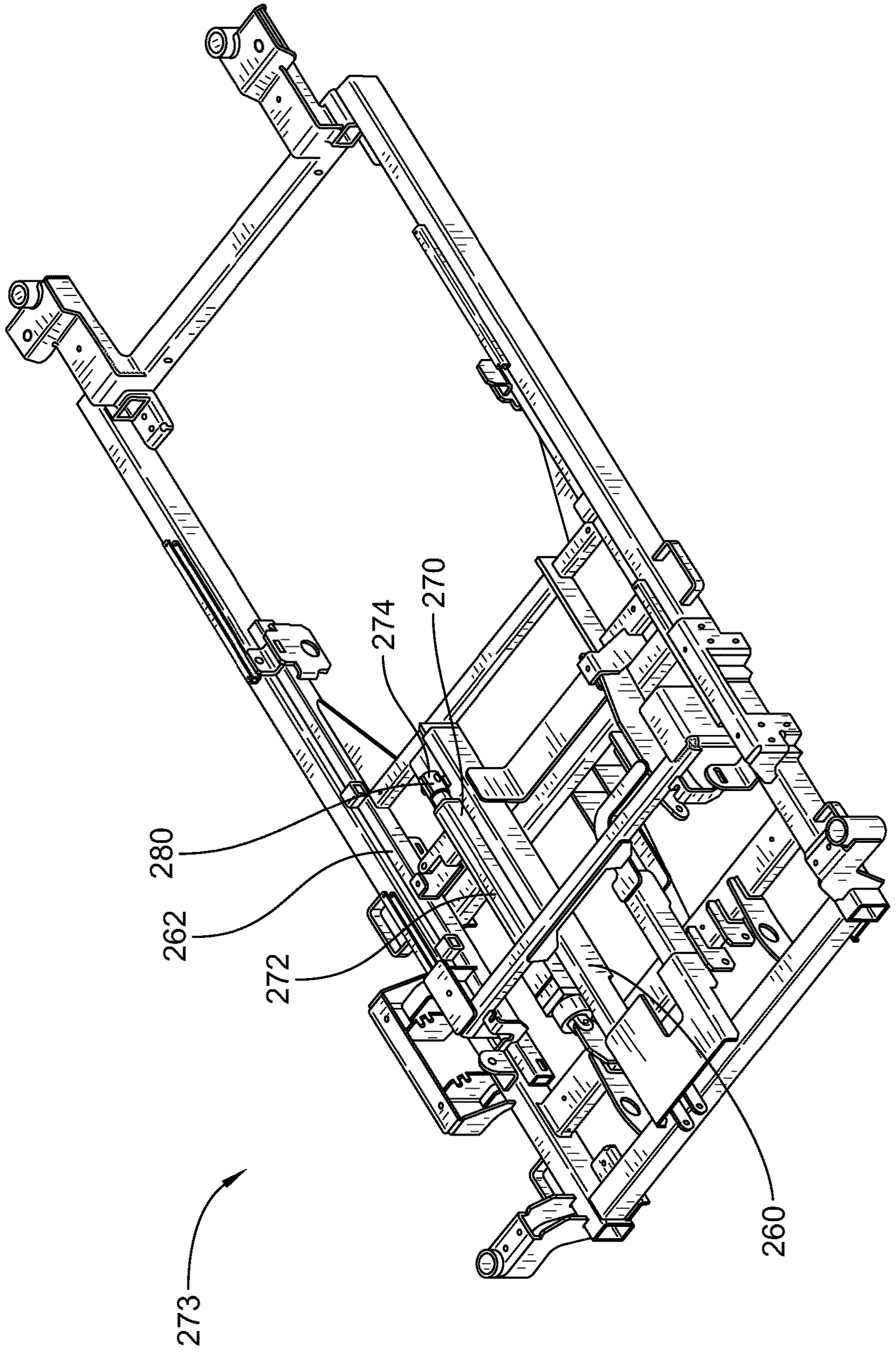
FIG. 6 is a side perspective view of an actuator in accordance with an embodiment and in a locked position, wherein a moveable frame is shown in a retracted position.

Referring to FIG. 6, an actuator 270 controls the movement of the moveable frame 262. The actuator 270 is controlled by the caregiver or patient by actuating the user inputs 204 of the control panel 200. The actuator 270 includes a fixed member 272 that is coupled to the stationary frame 260 and a moveable member 274 that telescopes between a locking position 273 (shown in FIG. 6) and an unlocking position 275 (shown in FIG. 7). The moveable member 274 includes a track 276 that the moveable frame 262 slides along. The moveable member 274 also includes a cantilevered end 278 having a stop 280. When the actuator 270 is in the locking position 273, the stop 280 prevents the moveable frame 262 from moving out of the retracted position toward the extended position 265. When the actuator is in the unlocking position, the stop 280 prevents the moveable frame 262 from moving beyond the extended position 265. In other words, the position of the stop 280 when the actuator is in the unlocking position defines the distance that the moveable frame can move from the retracted position to the extended position.

Figure 7:
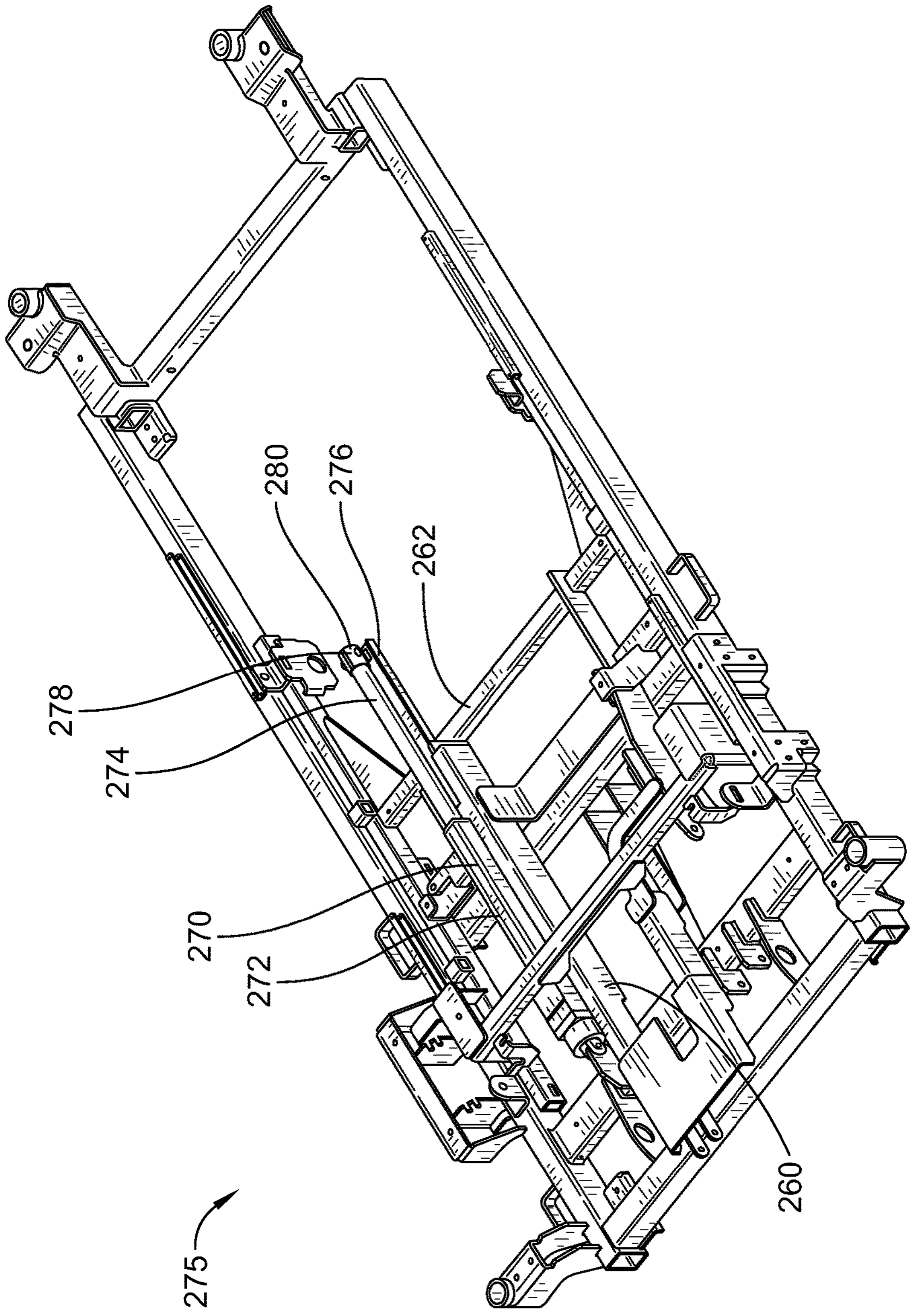
FIG. 7 is a side perspective view of the actuator shown in FIG. 6 and in an unlocked position, wherein the moveable frame is shown in the retracted position.
Figure 8:
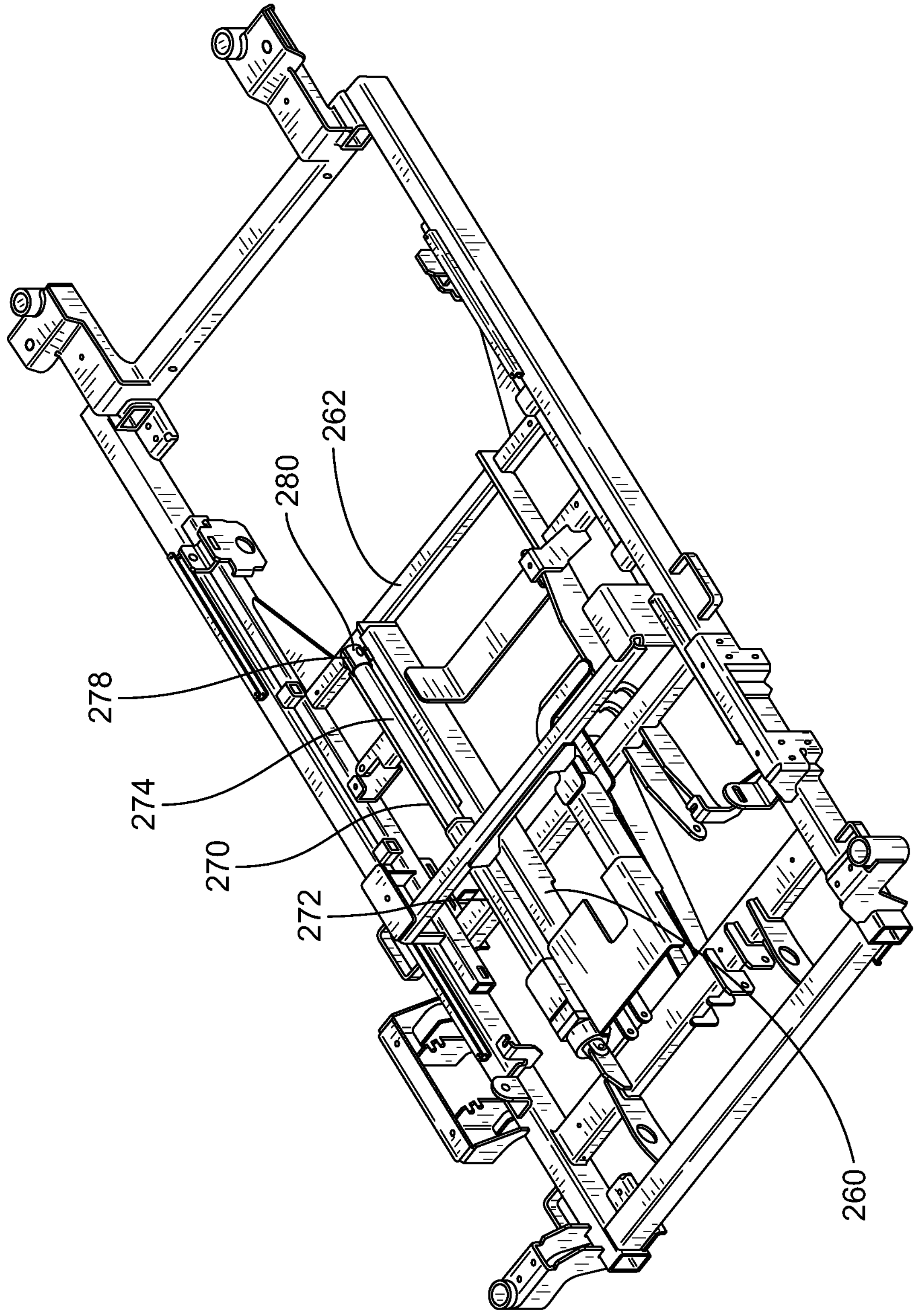
FIG. 8 is a side perspective view of the actuator shown in FIG. 7, wherein the moveable frame is shown in an extended position.

Referring to FIG. 7, the exercise regimen may be activated by a patient or caregiver at the control panel 200. During the exercise regimen, the articulated deck 250 may be tilted, such as being tilted to a predetermined reverse-Trendelenburg position. For example, the articulated deck 250 may be tilted within a range of 1 degree to 30 degrees depending upon a desired level (e.g., amount of difficulty) of exercise. When the exercise regimen is commenced, the actuator 270 becomes unlocked and moves the moveable member 274 to the unlocking position 275 thereby unlocking the moveable frame 262. A distance that the moveable member 274 moves to the unlocking position 275 may be determined by the patient or caregiver. The distance may be set within a range of 1 inch to 12 inches, for example. By controlling the distance of the unlocking position 275, a degree of difficulty of the exercise may be altered. The moveable frame 262 may then freely move along the track 276 to the stop 280, as illustrated in FIG. 8. The term "freely move" is not intended to exclude the inertia and the sliding or rolling friction that is inherently present in the apparatus 50 having the exercise system described herein. Movement of the moveable frame 262 enables the patient to exercise the patient's legs by moving the moveable frame 262 of seat section 256 and the components of apparatus 50 coupled thereto between the retracted position 263 and the extended position 265. While the patient exercises in this manner, the moveable member 274 of the actuator 270 remains extended in the unlocking position.

After the conclusion of the exercise regimen, the moveable member 274 of the actuator 270 returns to the locking position 273. The exercise regimen may be concluded by actuating a user input 204 on the control panel 200, for example. In some embodiments, the exercise regimen is concluded after a predetermined period of time that may be set using the control panel 200. Alternatively or additionally, the exercise regimen is concluded after a predetermined number of repetitions of leg presses by the patient using the exercise system of apparatus 50 described herein. Thus, in some embodiments, apparatus 50 has a sensor that produces a signal used to count the number of repetitions. The moveable member 274 returns to the locking position 273 at a predetermined speed to reduce the likelihood of the moveable frame 262 of the seat section 256 crashing into the thigh section 258. As the moveable member 274 returns to the locking position 273, the moveable frame 262 is captured by the stop 280 and homed back into the retracted position 263. After returning to the retracted position 263, the actuator 270 is locked or otherwise maintained in the locking position 273 to prevent movement of the moveable member 274 and the moveable frame 262 of the seat section 256.

Figure 9:
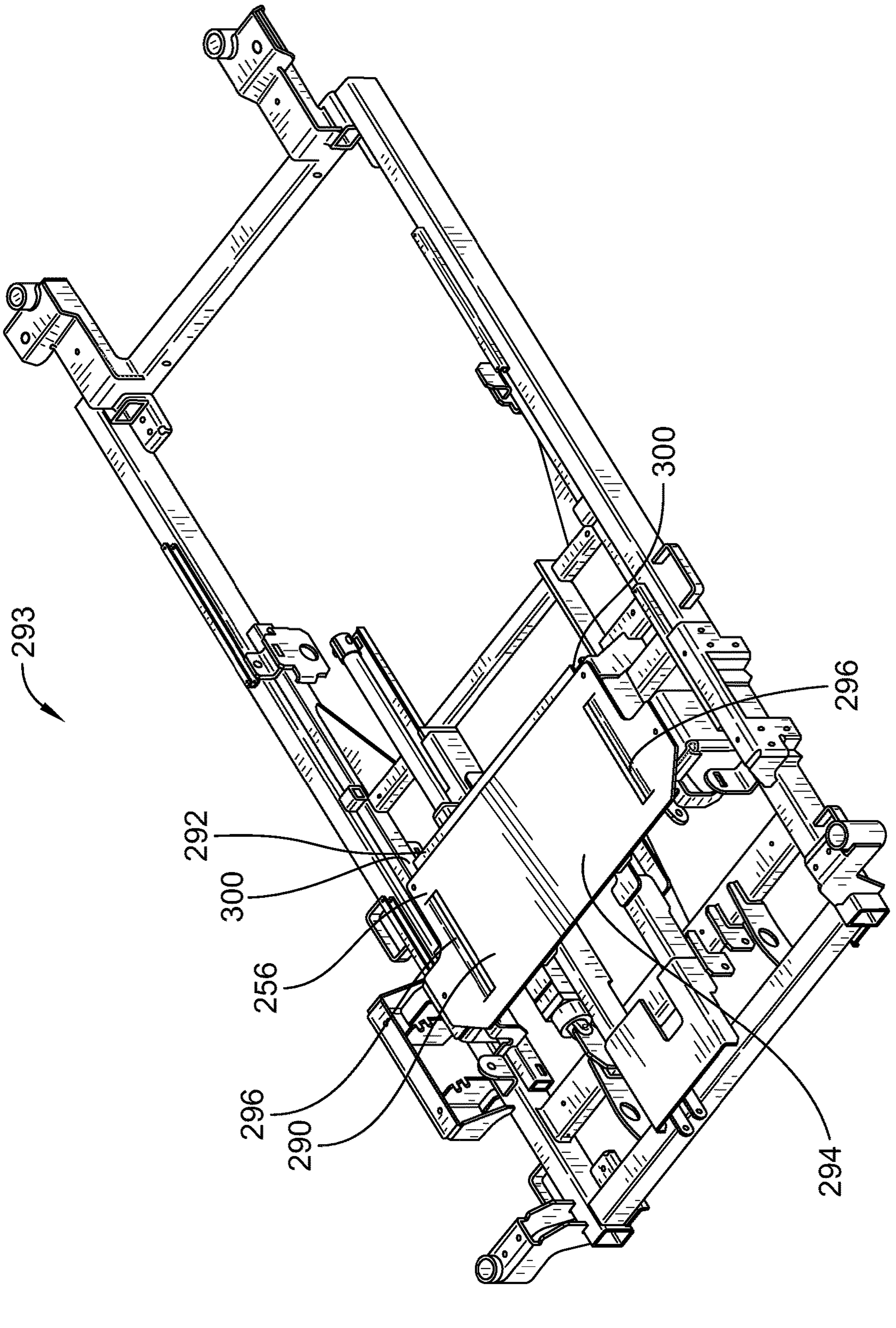
FIG. 9 is a side perspective view of an upper panel in accordance with an embodiment and in a retracted position relative to a lower panel.
Figure 10:
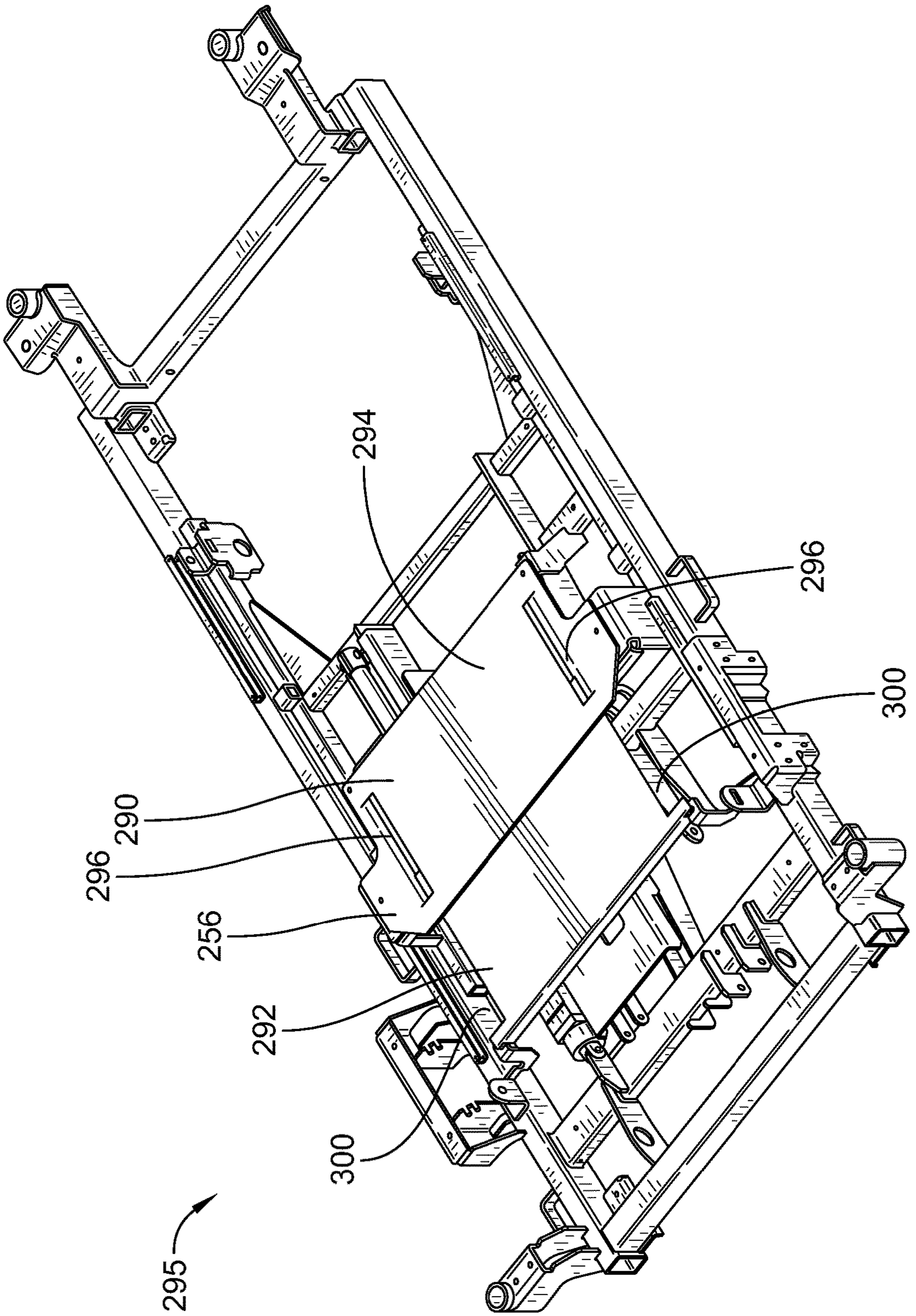
FIG. 10 is a side perspective view of the upper panel shown in FIG. 9 in an extended position relative to the lower panel.

Referring to FIG. 9, the seat section 256 includes an upper panel 290 and a lower panel 292. The upper panel 290 is attached to the moveable frame 262. The lower panel 292 is attached to the stationary frame 260. The upper panel 290 includes a main body 294 and a pair of flanges 296 (shown more clearly in FIG. 11) that extend downwardly from the main body 194 toward the lower panel 292. In some embodiments, flanges 296 are L-shaped flanges. The lower panel 292 includes a main body 298 having edges 300 that are received by the flanges 296. Thus, edges 300 are situated adjacent to a sidewall of the L-shaped flanges 296 with a bottom wall of the L-shaped flanges 296 underlying end regions of the lower panel 292. As the moveable frame 262 moves from the retracted position 263 to the extended position 265, the upper panel 290 slides outwardly relative to the lower panel 292 toward the head end of apparatus 50 with the flanges 296 sliding along the edges 300 of the lower panel 292. The upper panel 290 moves from a retracted position 293 (shown in FIG. 9) to an extended position 295 (shown in FIG. 10). In the extended position 295 of the upper panel 290, the lower panel 292 extends across a gap formed between the upper panel 290 of seat section 256 and the thigh section 258. A similar gap exists between the moveable frame 262 of the seat section 256 and the thigh section 258. The upper panel 290 prevents the patient and/or the mattress from falling into the gap during the exercise regimen.

Figure 11:
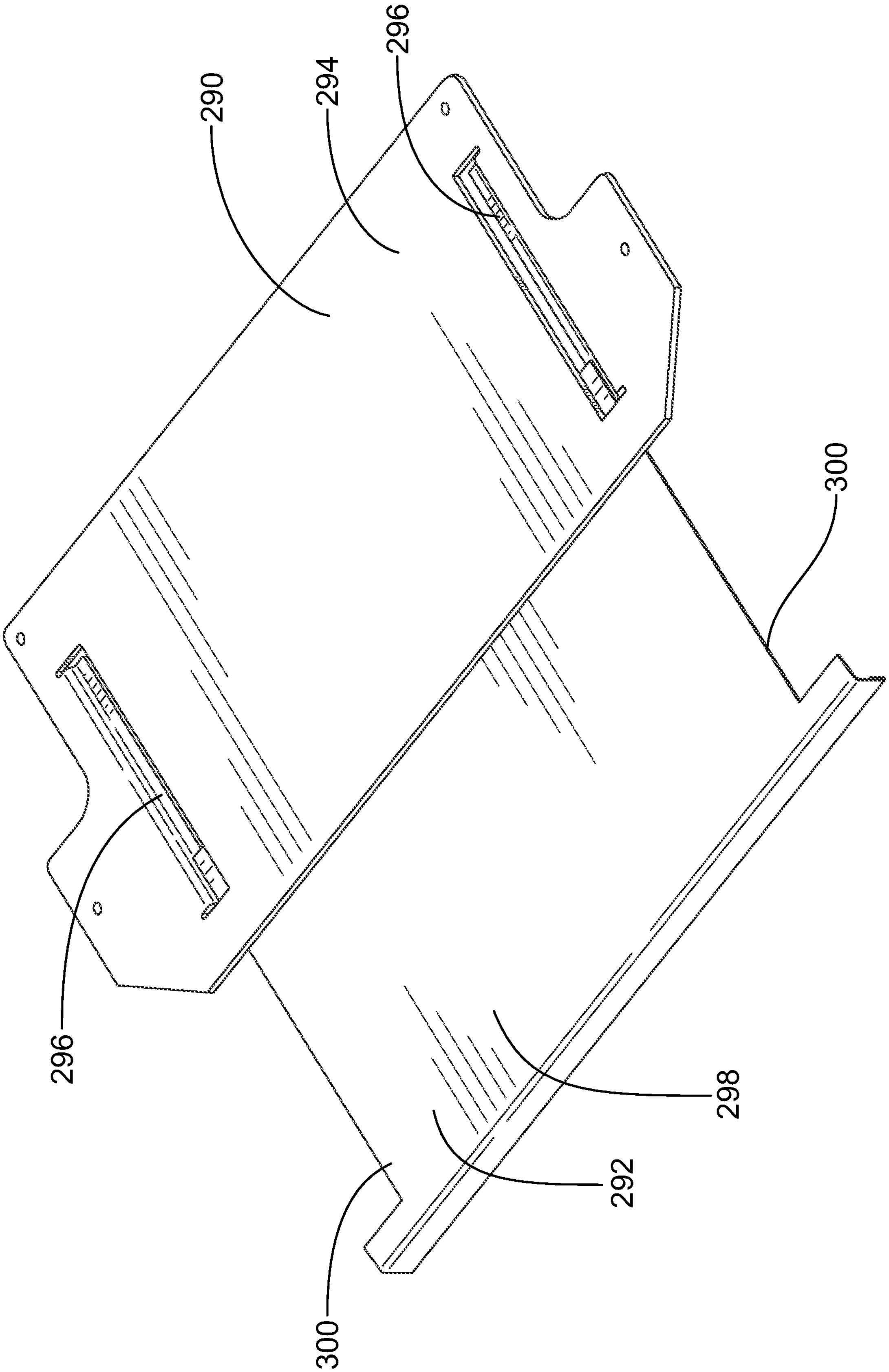
FIG. 11 is a side perspective view of the upper panel and lower panel shown in FIG. 9.

Referring now to FIG. 11, a track 320 is coupled to each side of the frame 252 but only one side of frame 252 is shown in FIG. 11. The track 320 on the other side of frame 252 is a mirror image of the one shown in FIG. 11. Thus, the description below of track 320 shown in FIG. 11 is equally applicable to the other track 320 which is a mirror image of the depicted track 320. The upper track 322 includes a base member 340 and a pair of spaced apart side members 342. The base member 340 and the side members 342 cooperate to form a channel 344. The channel 344 faces in a direction 346. In one embodiment, direction 346 is substantially horizontal. The lower track 324 includes a base member 350 and a pair of spaced apart side members 352. The base member 350 and the side members 352 cooperate to form a channel 354. The channel 354 faces in a direction 356. In one embodiment, the direction 356 is substantially vertical. Therefore, the direction 356 is substantially perpendicular to the direction 346.

The moveable frame 262 includes a base member 360 having a mounting bracket 362 attached thereto. A roller 364 extends from the mounting bracket 362. The roller 364 rolls along the channel 344 of the upper track 322 when the moveable frame 262 moves between the retracted position 263 and the extended position 265. A roller 370 extends from the base member 360. The roller 370 is oriented substantially perpendicular to the roller 364. The roller 370 rolls along the channel 354 of the lower track 324 when the moveable frame 262 moves between the retracted position 263 and the extended position 265.

Figure 12:
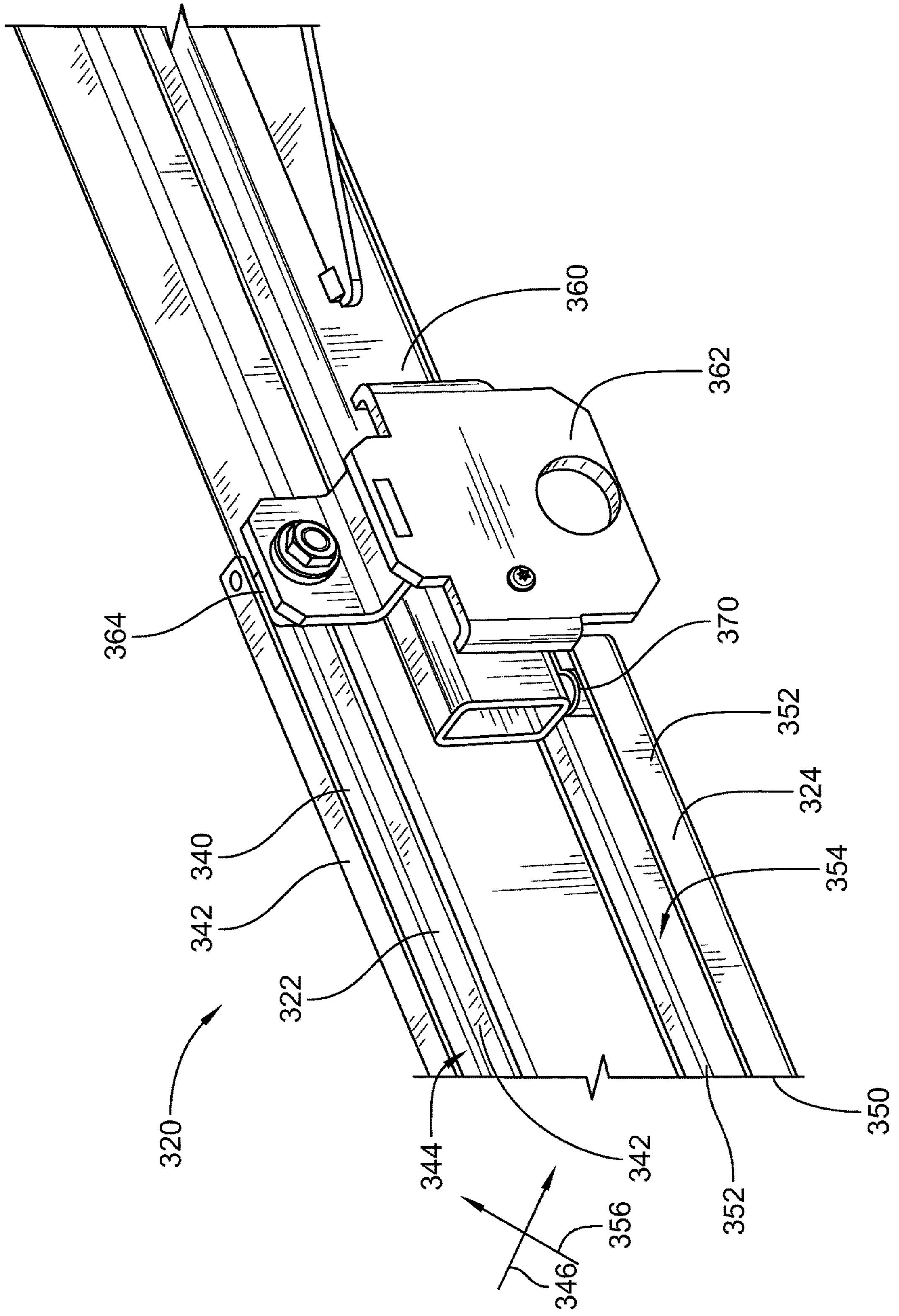
FIG. 12 is a side perspective view of a track of the articulated deck and rollers of the moveable frame positioned within the track.
Figure 13:
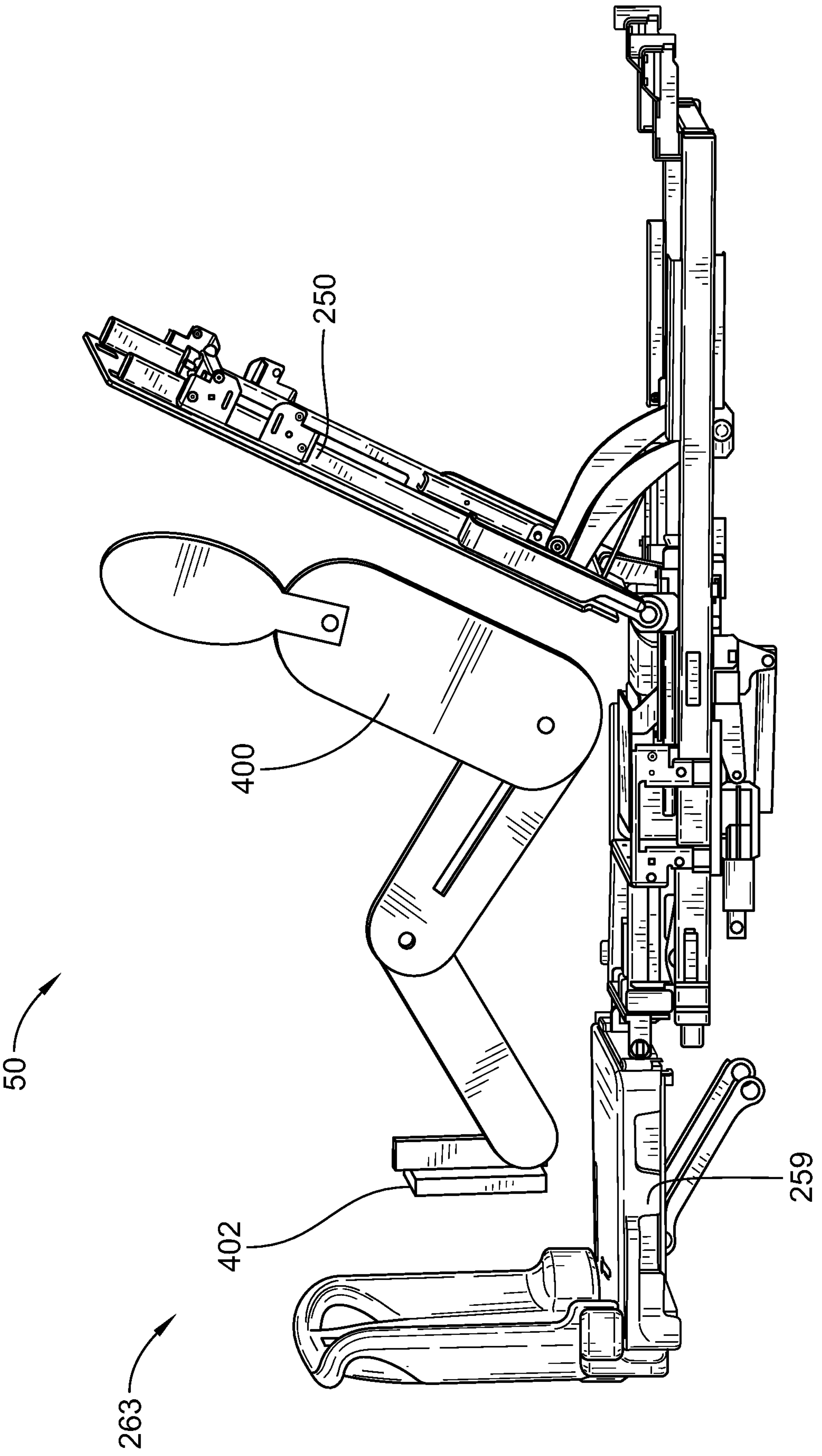
FIG. 13 is a side elevation view of a patient exercising on the patient support apparatus in a retracted position.

FIG. 12 illustrates a model of a female patient 400 exercising on the articulated deck 250. In the example illustrated in FIG. 12, the female patient 400 is a $5^{th}$ percentile patient having a height of approximately 58.9 inches. In such an embodiment, a foot rest 402 is positioned on the patient support apparatus 50 for the patient 400 to rest her feet against. The foot rest 402 may be coupled to frame of the apparatus 50. In another embodiment, the foot rest 402 is coupled to the footboard 210. As shown in FIG. 13, extension of the patient's legs results in approximately 4.4 inches of travel between the retracted position 263 and the extended position 265.

Figure 14:
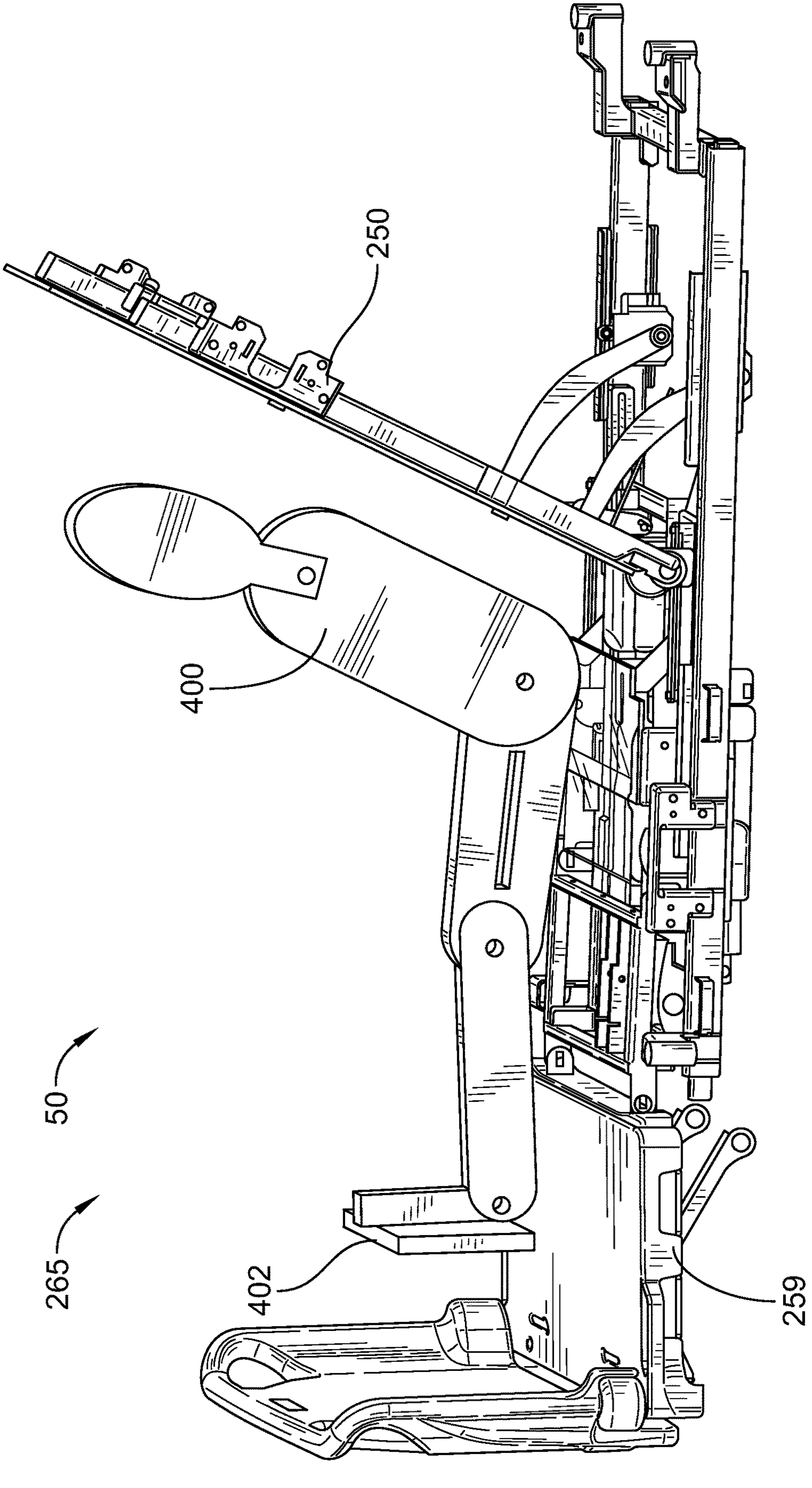
FIG. 14 is a side elevation view of the patient shown in FIG. 12 exercising on the patient support apparatus in an extended position.
Figure 15:
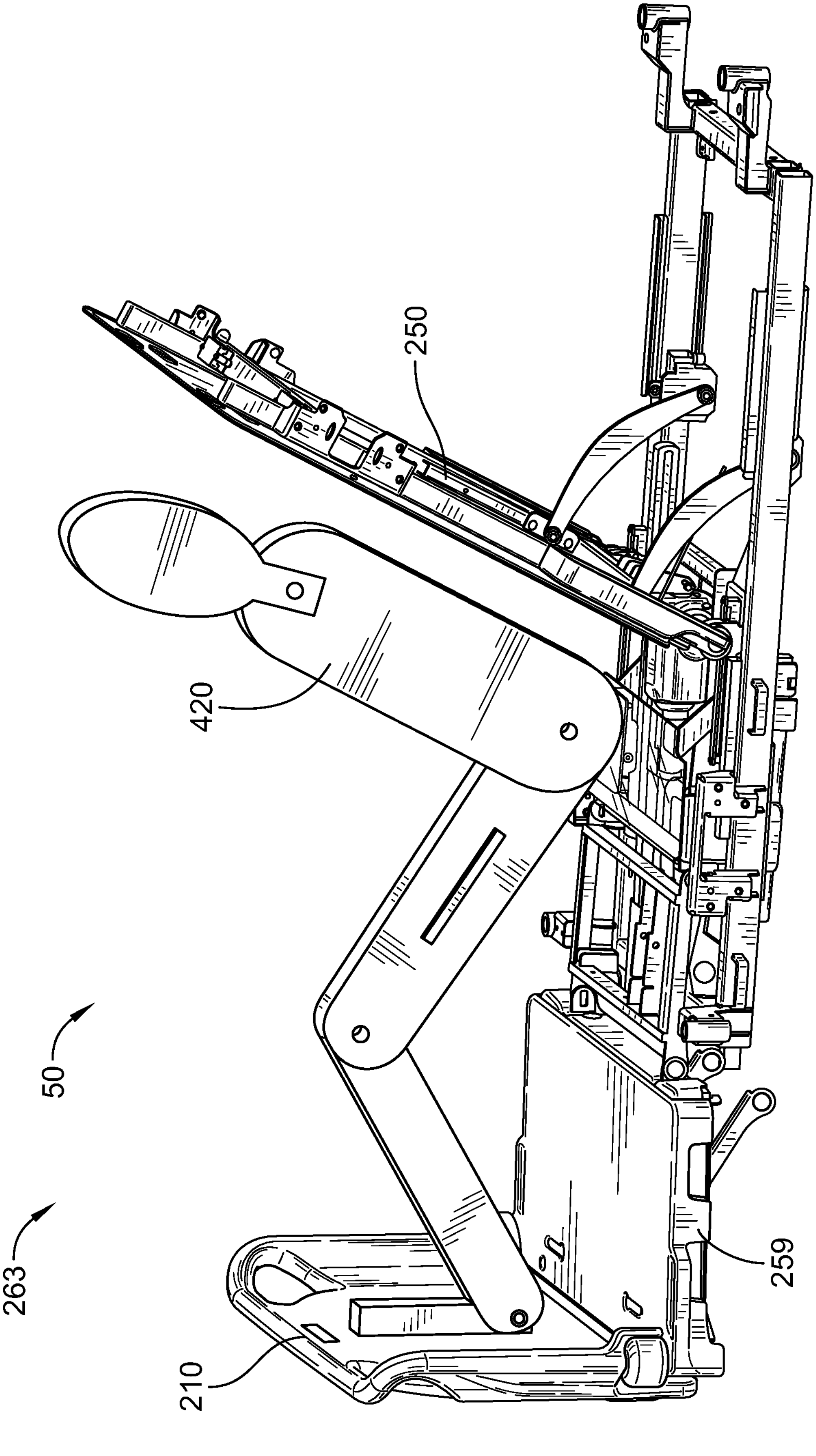
FIG. 15 is a side elevation view of another patient exercising on the patient support apparatus in a retracted position.

FIG. 14 illustrates a model of a male patient 420 exercising on the articulated deck 250. In the example illustrated in FIG. 14, the male patient 420 is a $95^{th}$ percentile male having a height of approximately 76.8 inches. In such an embodiment, the patient 420 places his feet directly against the footboard 210. As shown in FIG. 15, extension of the patient's legs results in approximately 6.4 inches of travel between the retracted position 263 and the extended position 265.

Figure 16:
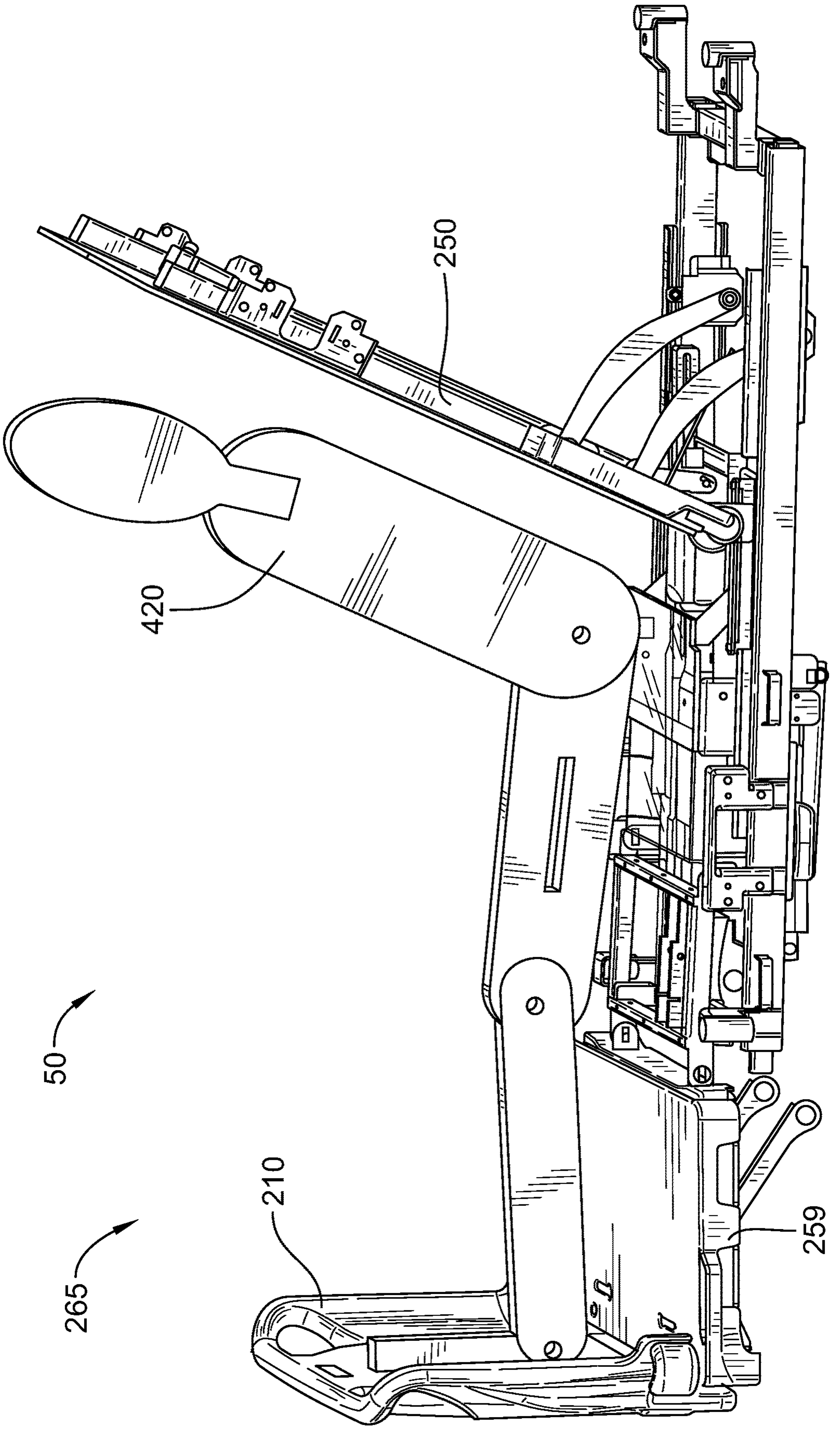
FIG. 16 is a side elevation view of a patient shown in FIG. 14 exercising on the patient support apparatus in an extended position.

FIG. 16 illustrates the patient 420 exercising with a knee angle of 82 degrees relative to the articulated deck 250. A panel 430 may be positioned by a caregiver under the patient's legs to aid the patient in achieving the 82 degree angle. By increasing the knee angle to 82 degrees, the patient 420 begins his exercise approximately 3.6 inches closer to the footboard 210 and can achieve 12 inches of travel between the retracted position 263 and the extended position 265. Once the appropriate angle is achieved, the caregiver removes the panel 430 before the patient begins exercising.

Figure 17:
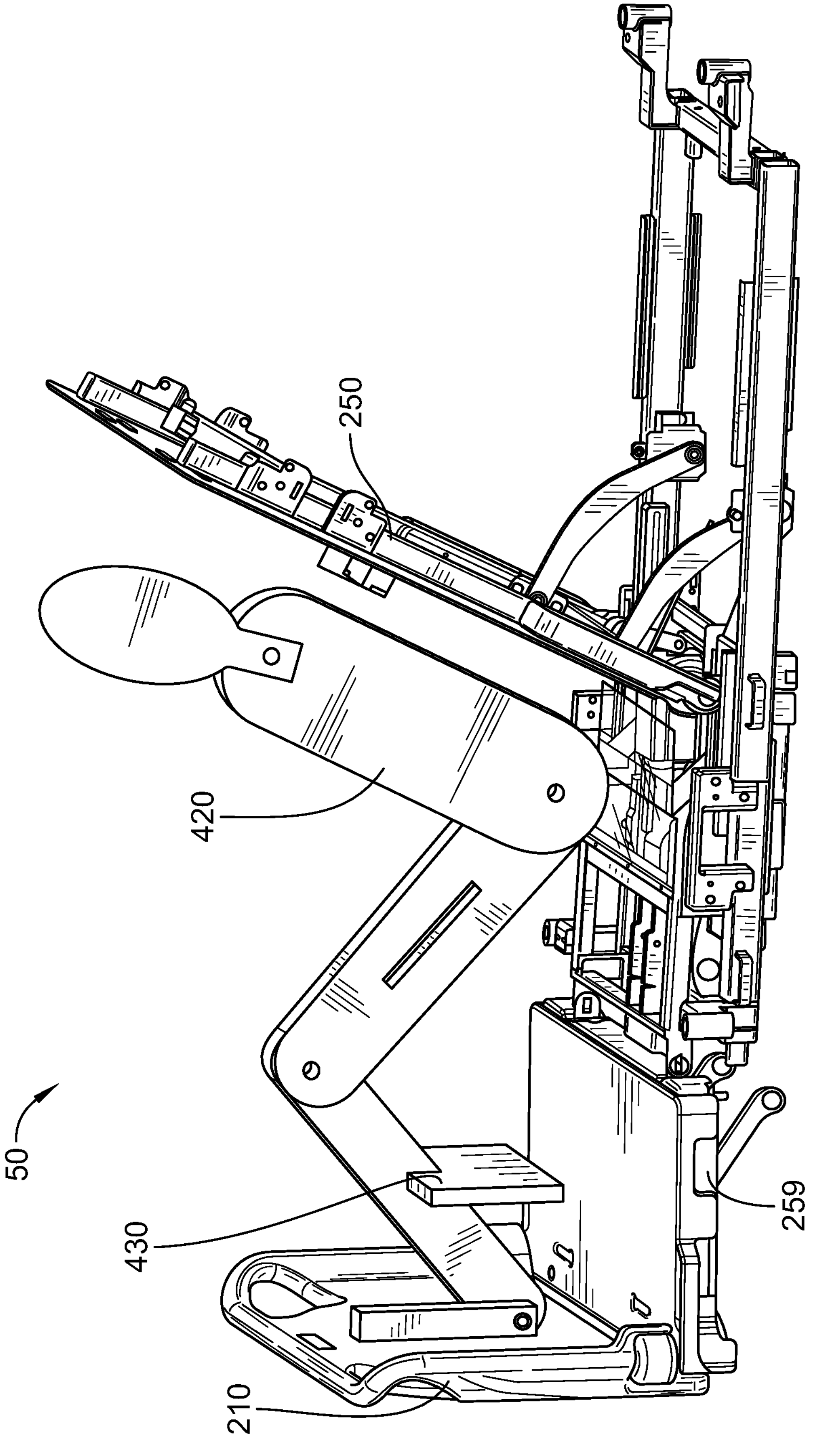
FIG. 17 is a side elevation view of a patient shown in FIG. 14 exercising on the patient support apparatus in a retracted position with a predetermined knee angle.

FIG. 17 illustrates the patient 400 exercising with a knee angle of 88 degrees relative to the articulated deck 250. By increasing the knee angle to 88 degrees, the patient 400 begins her exercise approximately 3.6 inches closer to the footboard 210 and can achieve 12 inches of travel between the retracted position 263 and the extended position 265.

Figure 18:
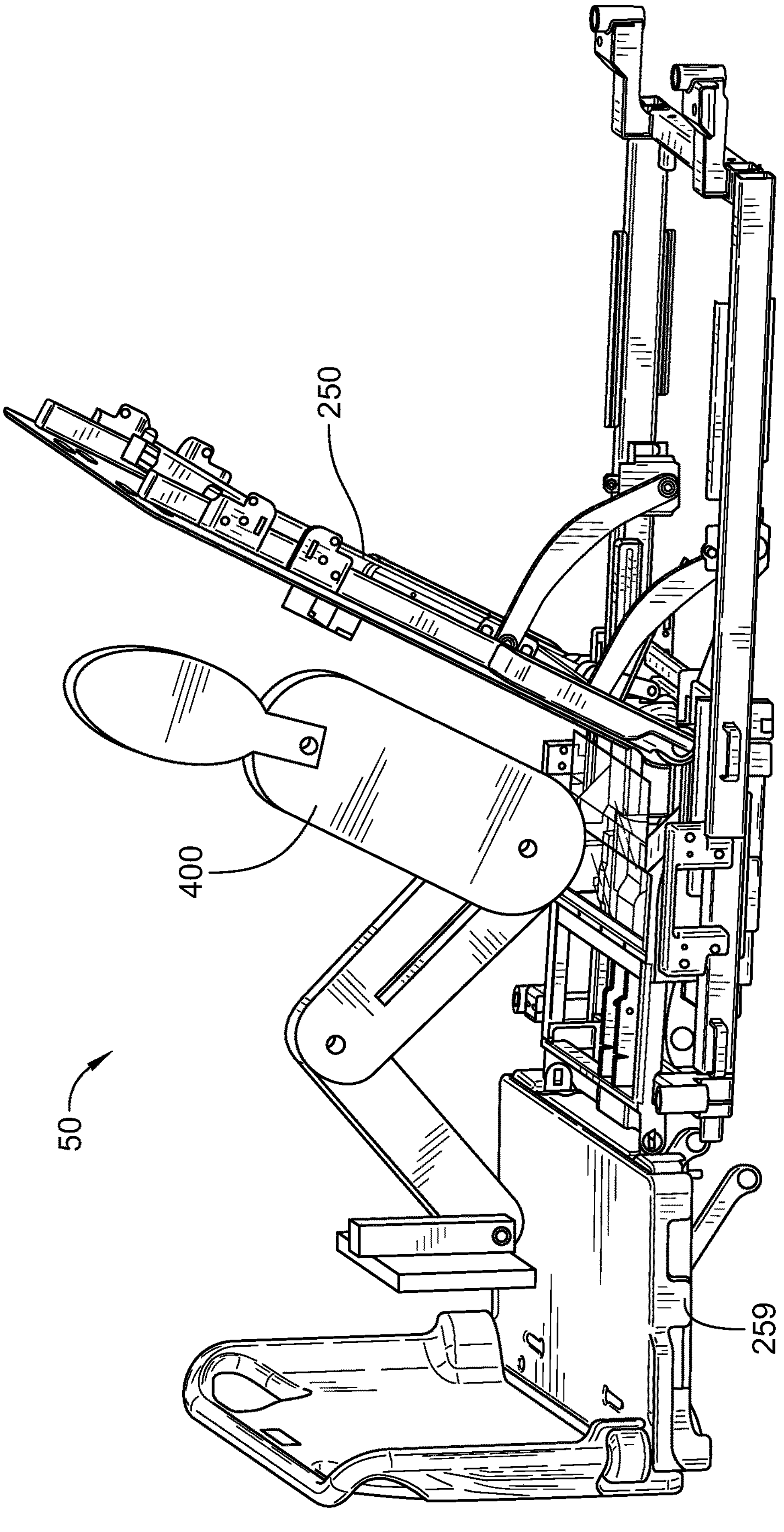
FIG. 18 is a side elevation view of a patient shown in FIG. 12 exercising on the patient support apparatus in a retracted position with a predetermined knee angle.

Referring to FIG. 18, in an alternative embodiment, a split footboard 450 may be used with the patient support apparatus 50. The split footboard 450 includes an upper footboard portion 452 and a lower footboard portion 454. An upper edge 456 of the lower footboard portion 454 is at or slightly above an upper surface 460 of the mattress 130. The lower footboard portion 454 includes a pair of sockets 464 into which posts 466 of the upper footboard portion 452 can be inserted so that the upper footboard portion 452 and the lower footboard portion 454 are aligned. The pair of posts 466 can be inserted into other sockets 470 in a foot section frame member 472 so that the upper footboard portion 452 is offset toward the head end 52 of the bed 50 relative to the lower footboard portion 454 to accommodate patients of shorter height. A series of these other sockets 470 can be provided in the foot section frame member 472 to accommodate different patient heights.

Figure 20:
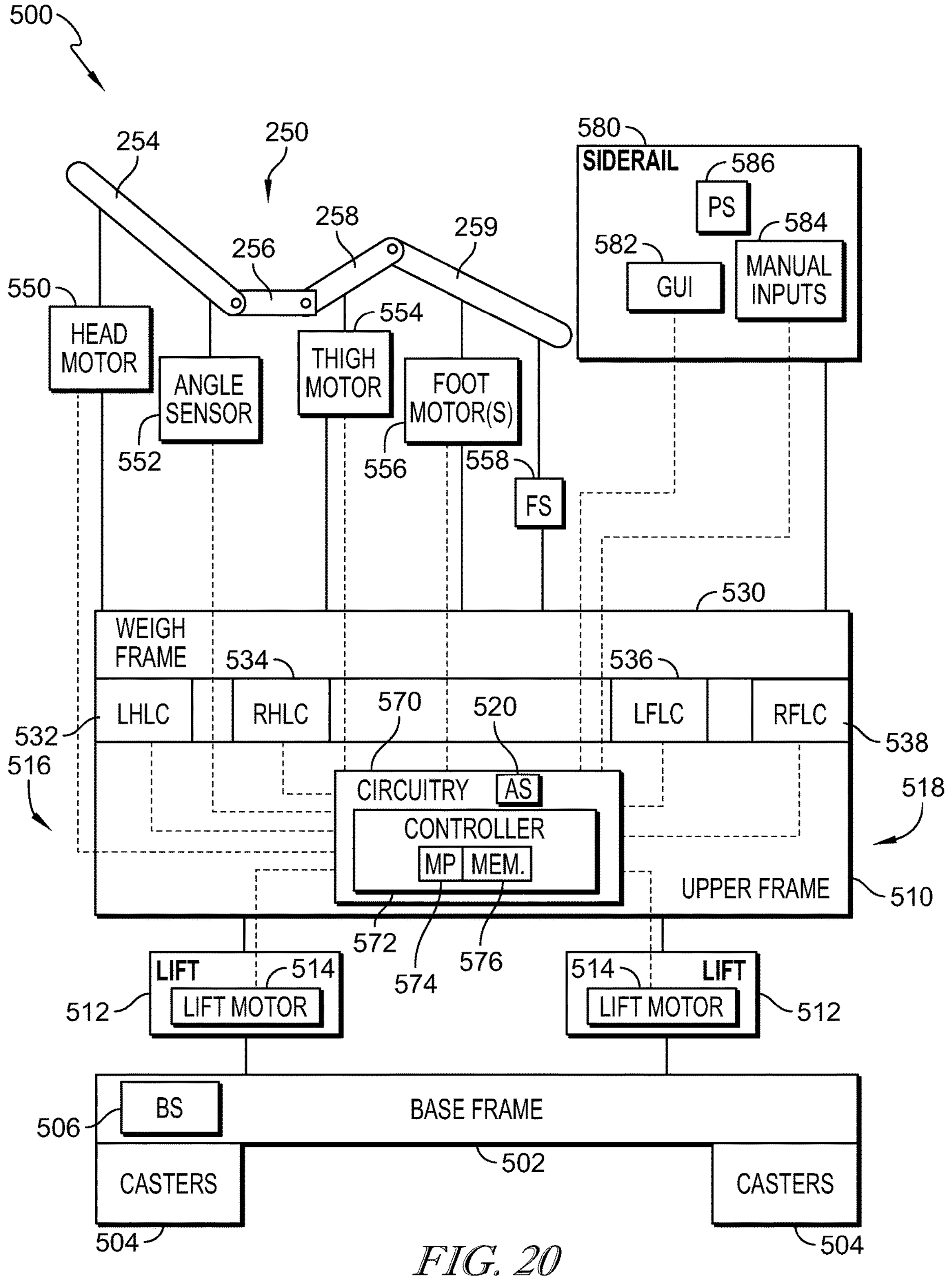
FIG. 20 is a schematic view of a patient support apparatus including the articulated deck shown in FIG. 4.

Referring to FIG. 20, a patient support apparatus 500 includes the articulated deck 250. The patient support apparatus 500 includes a base frame 502 having a casters 504 that enable the patient support apparatus 500 to be rolled throughout a healthcare facility. A brake sensor 506 detects whether a brake (not shown) of the casters 504 is activated. When the brake is activated, the casters 504 are prevented from rolling. An upper frame 510 is coupled to the base frame 502 by a lift system 512. The lift system 512 includes lift motors 514 that raise and lower a head end 516 and a foot end 518 of the patient support apparatus 500. For example, the lift motors 514 may be actuated to position the upper frame 510 in a Trendelenburg or reverse-Trendelenburg position. An angle sensor 520 is configured to detect the angle of the upper frame 510 relative to the base frame 502.

A weigh frame 530 is positioned on the upper frame 510 between the upper frame 510 and the articulated deck 250. The weigh frame 530 includes a left head load cell 532, a right head load cell 534, a left foot load cell 536, and a right foot load cell 538. The load cells 532, 534, 536, 538 are configured to detect loads on the patient support apparatus 500. For example, the load cells 532, 534, 536, 538 may detect whether a patient is present on the patient support apparatus or whether a patient has moved on the patient support apparatus.

A head motor 550 is configured to move the head section 254 relative to the seat section 256. An angle sensor 552 is provided to detect an angle of the head section 254. A thigh motor 554 is configured to move the thigh section 258 relative to the seat section 256. An angle sensor (not shown) may detect an angle of the thigh section 258. Foot motors 556 are configured to retract and extend the foot section 259. A foot sensor 558 detects a position of a foot extension (not shown) relative to a main portion of the foot section 259.

Apparatus 500 includes control circuitry 570 which, in turn, includes a controller 572 having a processor 574 and memory 576 to control the functions of the patient support apparatus 500. For example, the controller 572 controls the motors 550, 554, 556. The controller 572 is also configured to receive data signals from the load cells 532, 534, 536, 538. The controller 572 is further configured to receive data signals from each of the sensors 506, 520, 552, 558. Each of a pair of siderails 580 includes a position sensor 586 to detect whether the respective siderail 580 is in a raised or lowered position. At least one of the pair of siderails 580 of the patient support apparatus includes a graphical user interface 582 with user inputs 584. The controller 572 communicates with the graphical user interface 582 to display data related to the patient support apparatus 500. A caregiver may review the data using the user inputs 584. Additionally, the user inputs 584 may be activated to send messages to the controller 570 to control the patient support apparatus 500.

In some embodiments, the actuator 270 will only move to the unlocking position 275 to enable exercise if certain conditions are met. For example, the actuator 270 may only move to the unlocking position 275 if the brake sensor 506 detects that the at least one or more casters 504 is locked. In other embodiments, the actuator 270 may only move to the unlocking position 275 if at least one of the pair of siderails 580 is raised. Optionally, the actuator 270 may only move to the unlocking position 275 if both of the pair of siderails 580 are raised. In other embodiments, the actuator 270 may only move to the unlocking position 275 if the angle sensor 520 detects that the upper frame is in a reverse-Trendelenburg position. For example, the actuator 270 may only move to the unlocking position 275 if an angle of the upper frame 510 is tilted to a predetermined angle, for example between 1 degree and 20 degrees. In yet another embodiment, the actuator 270 may only move to the unlocking position 275 if the load cells 532, 534, 536, 538 detect that a patient is on the patient support apparatus 500. Further, the actuator 270 may only move to the unlocking position 275 if the angle sensor 552 detects that an angle of the head section 254 is beyond a threshold angle, for example beyond 30 degrees. In some embodiments, the actuator 270 may only move to the unlocking position 275 if the foot sensor 558 detects that the foot section 259 is fully retracted. In some embodiments, the actuator 270 may only move to the unlocking position 275 if a foot rest is positioned between the foot section 259 and the patient. For example, a caregiver may use the user inputs 584 to confirm that the foot rest is in position. In some embodiments, all of the above conditions must be met before the actuator 270 can move to the unlocking position 275. In other embodiments, only some of the above conditions must be met before the actuator 270 can move to the unlocking position 275. For example, in some embodiments, at least one of the conditions must be met. In another example, a combination of the conditions must be met.

Figure 21:
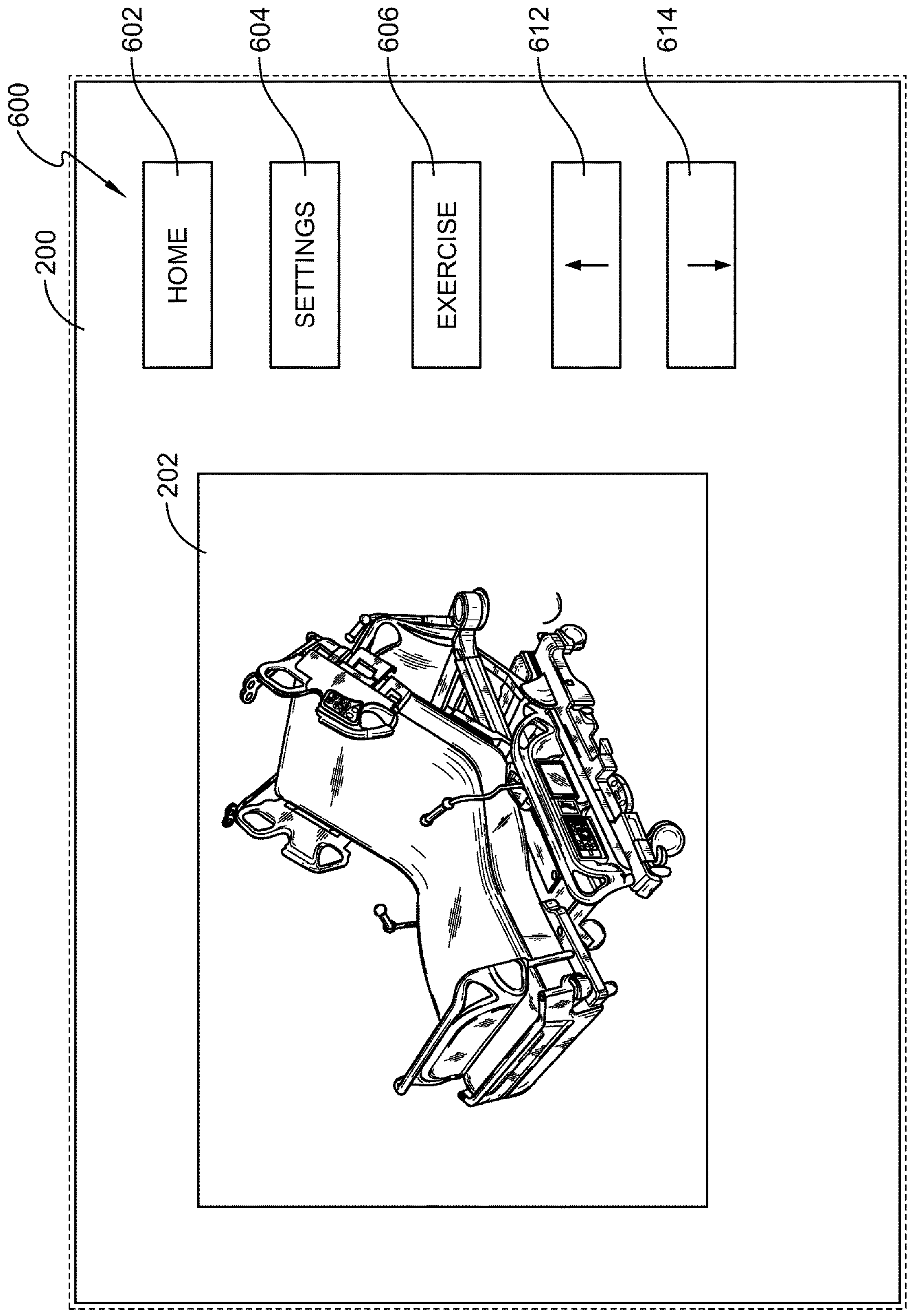
FIG. 21 is a schematic view of a display of a control panel in accordance with an embodiment.

Referring now to FIG. 21, the control panel 200 includes the display 202 and a field of operational buttons 600. In some embodiments, the display 202 is a graphical user interface that incorporates the buttons 600 as icons that operate as soft keys for the selection of various functions. In the illustrated embodiment, the display 202 shows the current configuration of the apparatus 50. In other embodiments, the display 202 may show various icons and buttons to operate the apparatus 50. For example, the display 202 may illustrate various icons and buttons to alter the settings of the apparatus 50.

The operational buttons 600 include a home button 602 that is selectable, such as by touching, to return the display 202 to a home screen (not shown). The home screen is a screen that is navigated to upon powering of the apparatus 50 or upon first use of the apparatus 50. A settings button 604 is selectable, such as by touching, to navigate the display 202 to a settings screen (not shown). The settings screen may include various icons and buttons that are selectable to alter settings of the apparatus 50. An exercise button 606 is selectable, such as by touching, to alter the apparatus 50 into a position for the patient to perform exercises, as described above. For example, selection of the exercise button 606 may cause the head section 254 to move to the raised position. Additionally, selection of the exercise button 606 may cause the actuator 270 to move to the unlocking position 275 so the moveable frame 262 can freely move between the retracted position 263 and the extended position 265. An up arrow button 612 and a down arrow button 614 are selectable, such as by touching, to scroll through various lists on the display 202. The up arrow button 612 and the down arrow button 614 may also be selectable to scroll through various screens on the display 202. It should be noted that the control panel 200 illustrated in FIG. 21 is exemplary only and the control panel 200 may include other buttons and icons configured to operate the apparatus 50.

Figure 19:
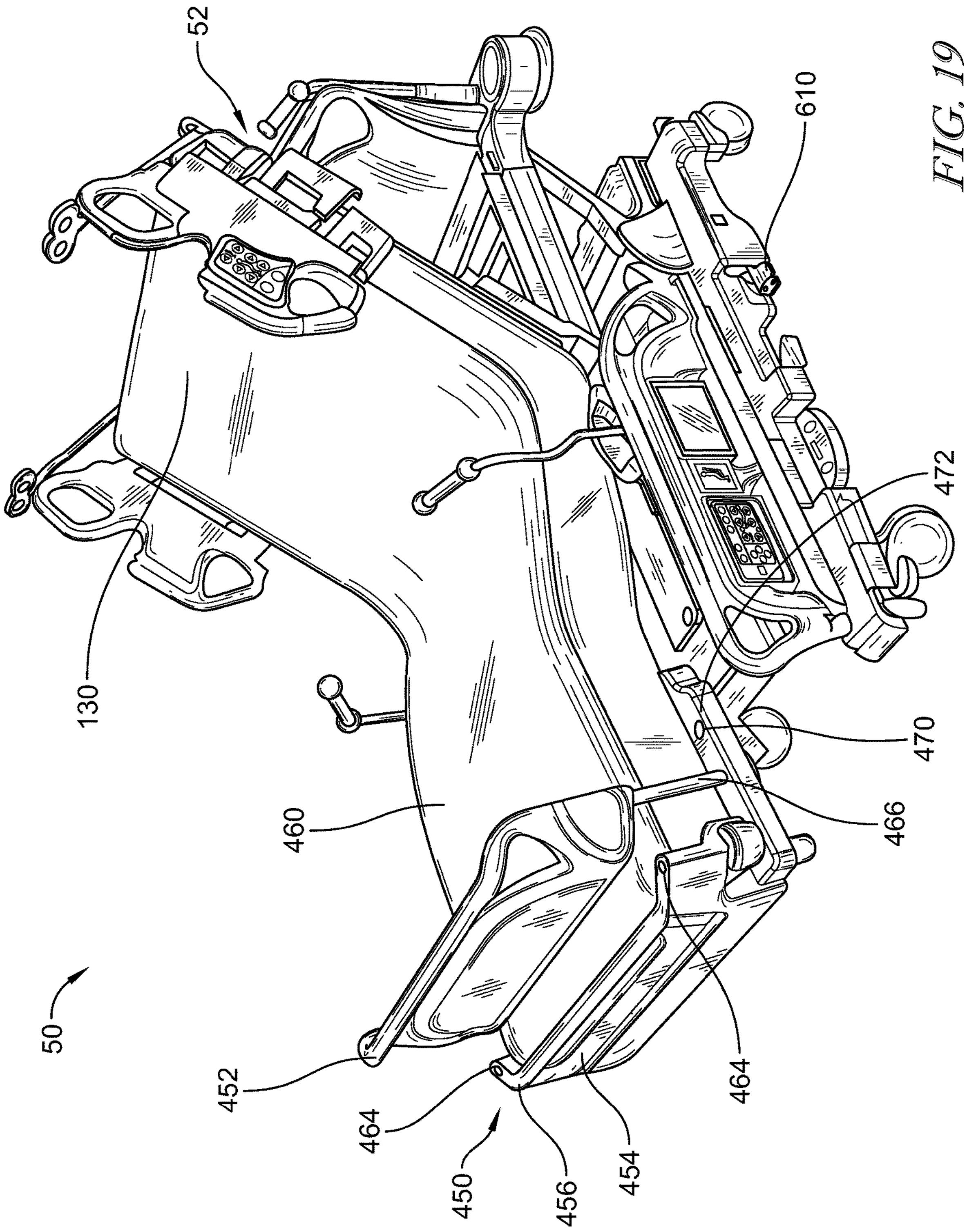
FIG. 19 is a side perspective view of a footboard in accordance with an embodiment.

Referring back to FIG. 19, a manual cardiopulmonary resuscitation (CPR) pedal 610 may be actuated to return the articulated deck 250 to a position wherein CPR may be performed. In other embodiments, a CPR lever or handle 718, described below, may be manually actuated to return the articulated deck 250 to a position wherein CPR may be performed. Thus, the pedal 610 and the lever or handle 718 are considered to be manual inputs that are used to activate the emergency CPR function of bed 50 according to the present disclosure.

The embodiments described herein will be described with respect to actuating the CPR pedal 610. In some embodiments, actuation of the CPR pedal 610 causes cables that are routed from the CPR pedal 610 to a bracket (not shown) to pull on a release pin (not shown) in a linear actuator (not shown) that raises and lowers the head section 254, as described in more detail in U.S. Pat. No. 7,469,433, which is hereby incorporate by reference herein in its entirety. In some embodiments, actuation of the CPR pedal 610 releases a wrap spring or other clutch inside of the linear actuator (not shown) that raises and lowers the head section 254. The release of the wrap spring or clutch decouples a leadscrew of the linear actuator from the motor of the linear actuator which allows a nut (e.g., a ball nut) inside the linear actuator to back drive against a lead screw of the linear actuator, thereby allowing the linear actuator to retract due to rotation of the lead screw within the linear actuator without the need for operation of the motor of the linear actuator.

Figure 25:
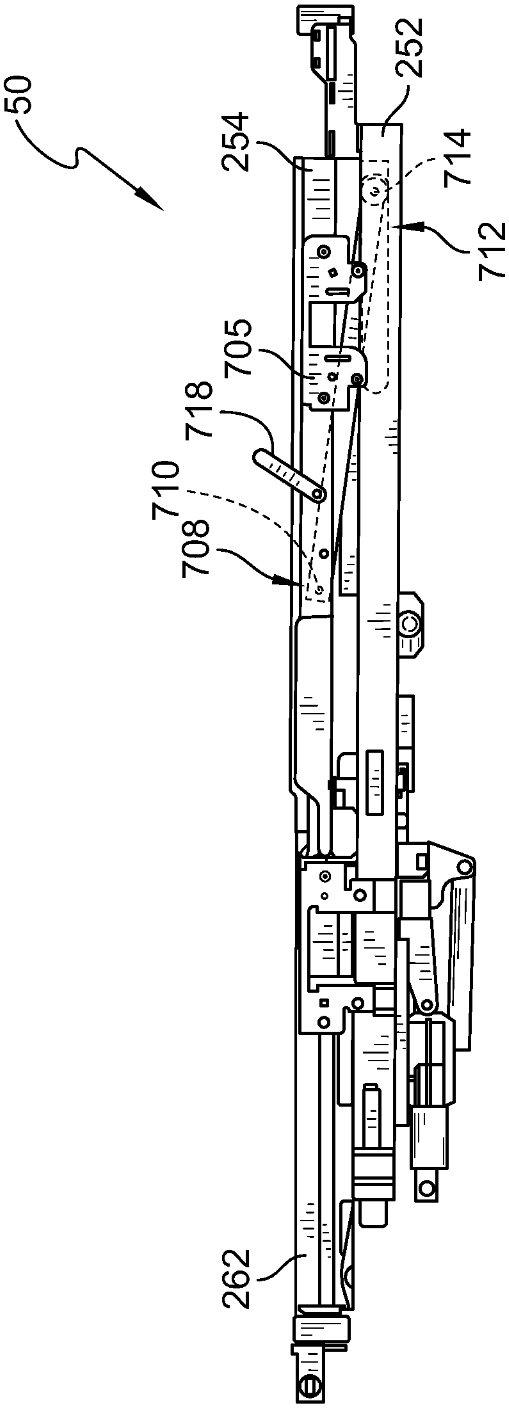
FIG. 25 is a side elevation view of the patient support apparatus having a CPR homing link, wherein the head section of the articulated deck is positioned at approximately 0 degrees.

In response to activation of the emergency CPR function of bed 50, such as by use of pedal 610, the head section 254 is rapidly guided to a lowered position, as shown in FIG. 25. Additionally, actuation of the CPR pedal 610 may cause the moveable frame 262 to move to the retracted position 263. Accordingly, actuation of the CPR pedal 610 may also cause the upper panel 290 to move to the retracted position 293. In some embodiments, movement of the moveable frame 262 from actuation of the CPR pedal 610 causes the actuator 270 to return to the locked position 273. In other embodiments, the actuator 270 remains in the unlocked position 275 and the moveable frame 262 moves relative to the actuator 270.

In some embodiments, the CPR pedal 610 must be held in an actuated position by the caregiver to fully lower the head section 254 to the lowered position. If the CPR pedal 610 is released during lowering of the head section 254, the head section 254 is stopped. In this way, the head section 254 may be stopped from lowering when an obstruction is located between the head section 254 and the frame 252. In some embodiments, stopping movement of the head section 254 causes the moveable frame 262 to stop moving to the retracted position 263. In some embodiments, stopping movement of the head section 254 causes the upper panel 290 to stop moving to the retracted position 293. In some embodiments, stopping movement of the head section 254 causes the actuator 270 to stop moving to the unlocked position 275.

Figure 22:
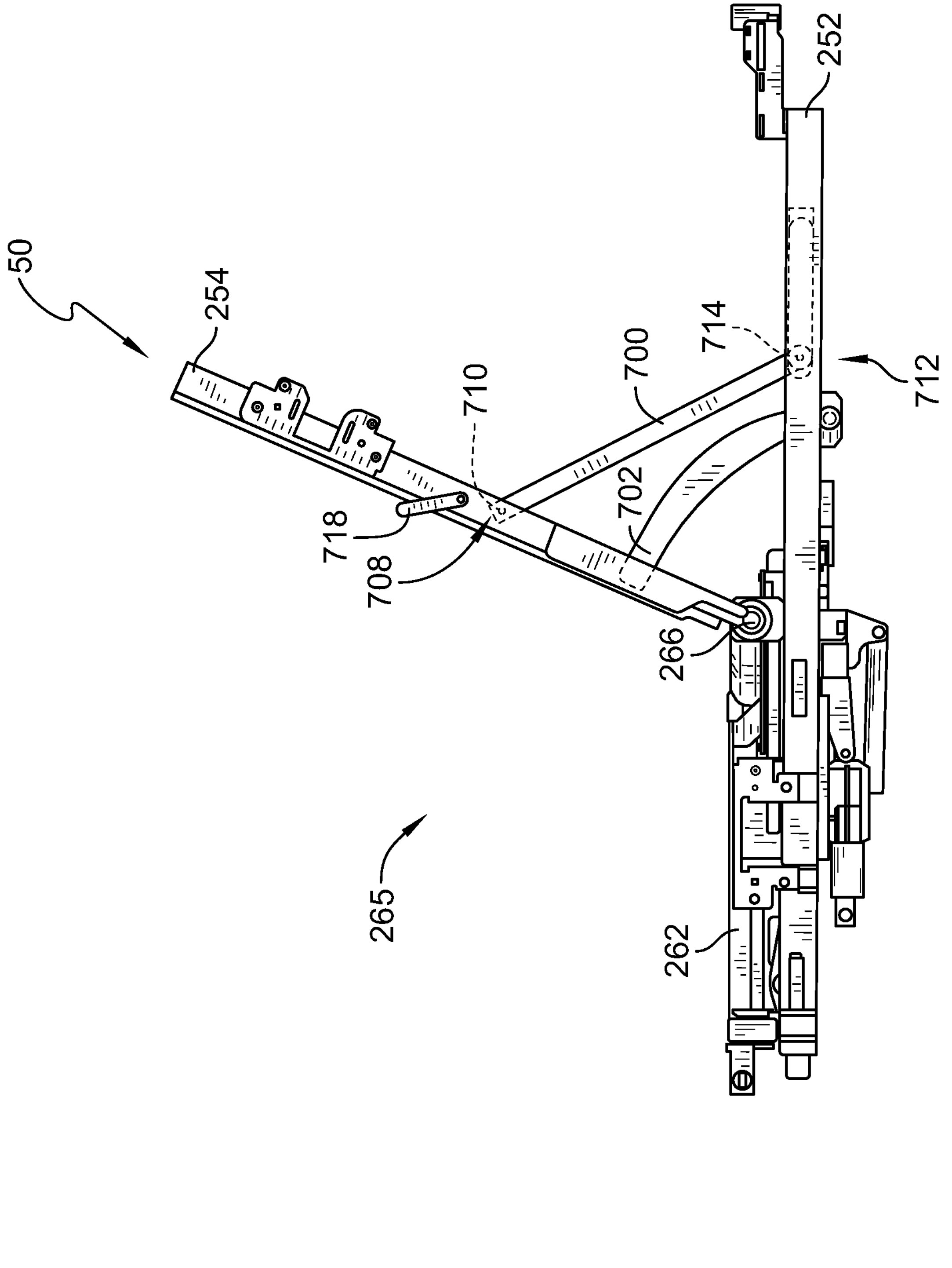
FIG. 22 is a side elevation view of the patient support apparatus having a CPR homing link, wherein the head section of the articulated deck is positioned at approximately 45 degrees.

Referring now to FIG. 22, the patient support apparatus 50 is illustrated having a CPR homing link 700 extending between the head section 254 and the frame 252. A first end 708 of the CPR homing link 700 is coupled to the head section 254 at a pivot joint 710. Accordingly, the CPR homing link 700 pivots relative to the head section 254 as the head section 254 is raised and lowered. A second end 712 of the CPR homing link 700 is coupled to the frame 252 at a longitudinally translatable pivot joint 714. In particular, the CPR homing link 700 is sized and configured so that second end 712 simultaneously pivots and translates relative to the frame 252 as the head section 254 is moved between a raised position, shown in FIG. 22, and an intermediate position, shown in FIG. 23. During lowering of the head section 254 from the intermediate position of FIG. 23 to a lowered position, shown in FIG. 25, the second end 712 of the CPR link 700 is prevented from further translation toward the head end of bed 50 by a stop 840 (discussed in further detail below in connection with FIG. 26) and so the second end 712 of the CPR link 700 only pivots relative to frame 252 during movement of the head section 254 between the intermediate position and the lowered position.

The head section 254 is coupled to the moveable frame 262 at the pivot joint 266 as discussed above. A rotating link 702 further couples the head section 254 to the moveable frame 266. The head section 254 is configured to pivot about the pivot joint 266 to enable the head section 254 to move between the raised position, shown in FIG. 22, and the lowered position, shown in FIG. 25, relative to the frame 262 and therefore, relative to frame 252. In FIG. 22, the head section 254 is illustrated at an angle of approximately 80 degrees relative to the frame 252. As the head section 254 pivots about the pivot joint 266, the rotating link 702 pivots relative to the head section 254 and the moveable frame 262 to enable the head section 254 to raise and lower. The rotating link 702 is positioned further from the head end 52 of bed 50 than the CPR homing link 700. In some embodiments, the rotating link 702 is shorter in length than the CPR homing link 700.

In FIG. 22, the moveable frame 262 is shown in the extended position 265. That is, the actuator 270 is in the unlocking position 275 to enable movement of the moveable frame 262 between the retracted position 263 and the extended position 265. If a patient on bed 50 goes into cardiac arrest, then it is desirable to perform CPR on the patient as soon as possible. Thus, the moveable frame 262 should be returned to the retracted position 263 and the head section 254 should be returned to the lowered position so that CPR can be administered. In some embodiments such as the illustrative embodiment of FIGS. 22-25, the CPR lever 718 is coupled to the head section 254 and is actuated to implement the emergency CPR function of bed 50, thereby to release the head section 254 for rapid movement to the lowered position. In other embodiments, the CPR lever 718 is coupled on the frame 252. In connection with the lowering of head section 254 during the emergency CPR release function, the phrase "rapid movement" and similar such phrases used herein are intended to mean that the head section 254 moves to the lowered position more quickly than if the head section linear actuator were powered electrically to move the head section 254 such as during normal operation of bed 50.

Figure 26:
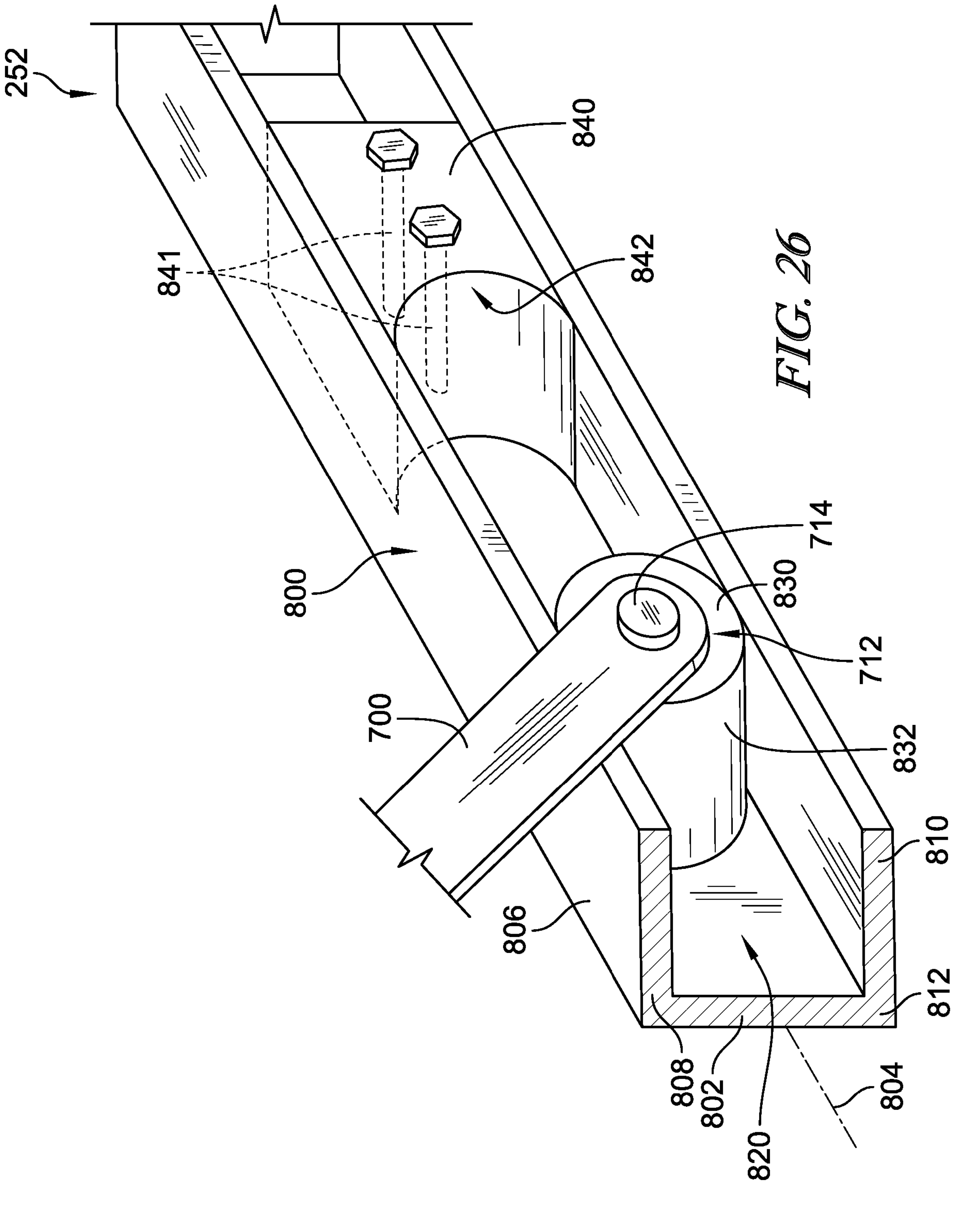
FIG. 26 is a perspective view of a rail coupled to the frame so that the CPR homing link may move along an axis of the rail.

Referring now to FIG. 26, a portion of frame 252 is shown and is configured as a rail 800 having a C-shaped cross section. Actually, frame 252 has rails 800 serving as longitudinally extending frame members on opposite sides of the bed 50. The rails 800 are oriented so that the C-shape of rails 800 open inwardly toward a longitudinal centerline of frame 252. Thus, the rails 800 are mirror images of each other. In other embodiments, rails 800 are separate components that are affixed to some other frame member of frame 252. The discussion that follows regarding one of rails 800 is equally applicable to both rails 800, but keeping in mind that the rails 800 are mirror images of each other.

The rail 800 includes a generally vertically oriented base segment 802 that extends along an axis 804 of the rail 800. Axis 804 is parallel with the longitudinal dimension of bed 50. An upper flange 806 extends generally perpendicularly from a top 808 of the base segment 802. The upper flange 806 also extends along the axis 804. A lower flange 810 extends generally perpendicularly from a bottom 812 of the base segment 802. The lower flange 810 also extends along the axis 804. The base segment 802, the upper flange 806, and the lower flange 810 form a channel member defining a channel 820 that extends along the axis 804.

A roller 830 with a substantially cylindrical outer perimeter 832 is received within the channel 820 and rolls along lower flange 810 during movement of the head section 254 between the raised and intermediate positions. The roller 830 is coupled to the CPR homing link 700 at the pivot joint 714. The pivot joint 714 is configured as an axle for the roller 830 and so is sometimes referred to herein as axle 714. Thus, the CPR homing link 700 pivots about axle 714 and the roller 830 rotates relative to axle 714 or, alternatively, the lower end 712 of the CPR homing link 700 is fixed to axle 714 such that axle 714 rotates within the bore of roller 830 whenever the CPR homing link 700 pivots. The axle 714, therefore, defines a pivot axis about which the CPR homing link 700 pivots as the head section 254 moves between the raised and lowered positions. The roller 830 is configured to move along the channel 820 as needed. For example, as the patient exercises as described above, the roller 820 moves along the axis 804 of the channel 820 to enable the CPR homing link 700 to move with the moveable frame 262 and the head section 254.

A stop 840 is positioned within the channel 820 and, in the illustrative embodiment, is fixed in place by a pair of bolts 841 that extend through holes formed in the stop 840 and that thread into holes formed in the base segment 802 of rail 800. In other embodiments, stop 840 is welded to rail 800 or is formed integrally with the rail 800. The stop 840 is preferably made from metal (e.g., steel or aluminum) but may be formed from other materials such as rubber, plastic, or the like. Roller 830 may be made from any of these same materials as desired. Stop 840 is formed to include a curved stop surface 842 to allow the roller 830 to nest in the stop 840 when the outer perimeter 832 of the roller 830 contacts the stop 840. In alternative embodiments, the roller 830 is replaced by a slide block that slides within channel 820 along flange 810 of rail 800 during movement of the head section 254 between the raised and intermediate positions and during exercise of the patient. In some such embodiments, the slide block is made of a plastics material and the stop 840 is configured with a flat stop surface that is engaged by the slide block when the head section 254 reaches the intermediate position during lowering, for example.

Figure 23:
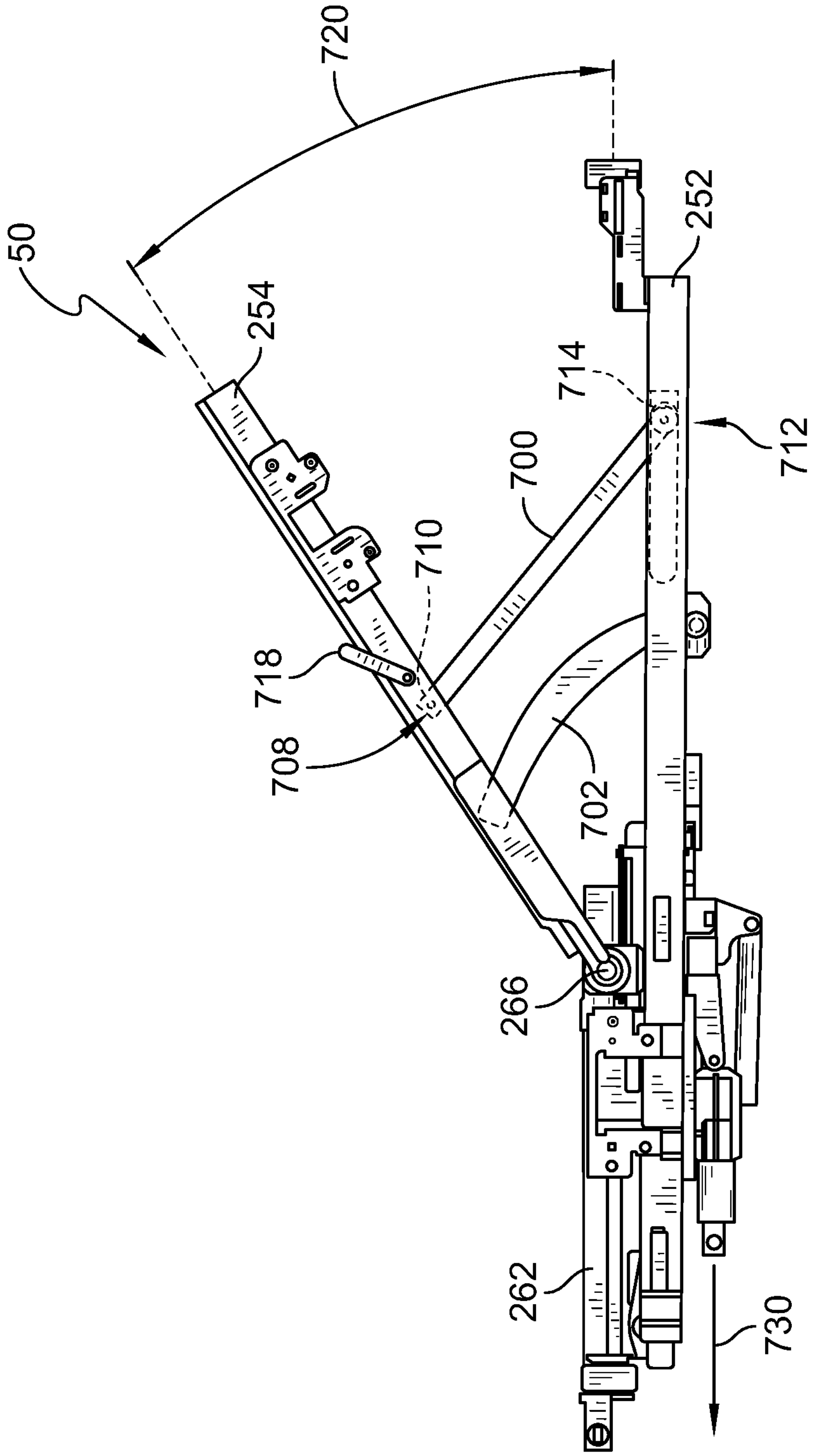
FIG. 23 is a side elevation view of the patient support apparatus having a CPR homing link, wherein the head section of the articulated deck is positioned at approximately 30 degrees.

When the head section 254 is at the 45 degree angle, as shown in FIG. 23, the roller 830 is still positioned away from the stop 840 because the head section has not yet reached 30 degrees which, in the illustrative example, is the angle at which head section 254 relative to frame 252 is considered to be in the intermediate position. Accordingly, with the head section 254 at the 45 degree angle, the patient is still enabled to exercise because the roller 830 is able to move along the channel 820 without contacting the stop 840. This enables free movement of the moveable frame 262 between the extended position 265 and the retracted position 263 during exercise.

Figure 24:
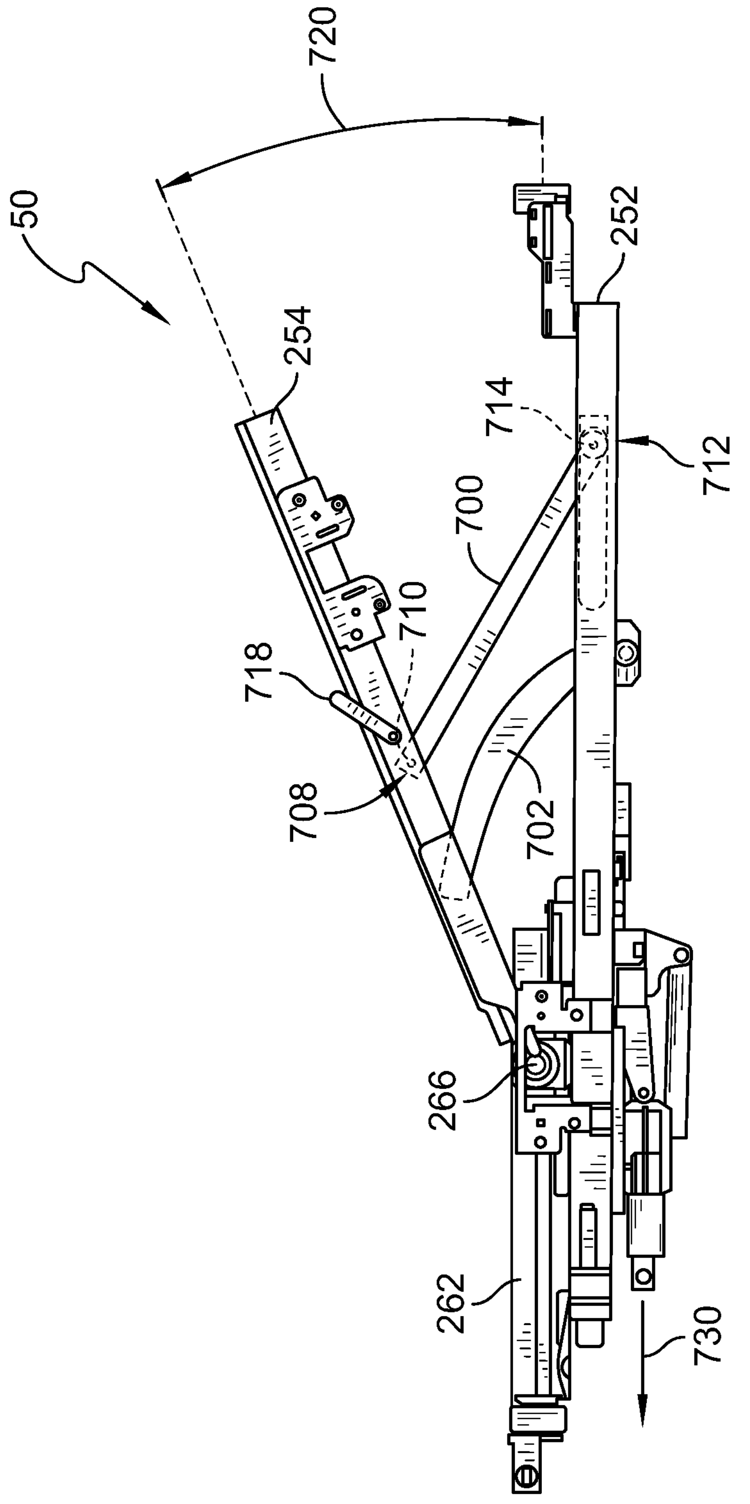
FIG. 24 is a side elevation view of the patient support apparatus having a CPR homing link, wherein the head section of the articulated deck is positioned at approximately 15 degrees.

FIG. 23 illustrates the apparatus 50 after the CPR pedal 610 or lever 718, as the case may be, is actuated to drop the head section 254 and the head section 254 has lowered from the raised position of FIG. 22 to an angle of about 45 degrees with respect to frame 252. In FIG. 24, the head section 254 has dropped further downwardly to the intermediate position of about 30 degrees relative to the frame 252. Thus, the head section 254 is angled relative to the rail 800 by about 30 degrees when the head section 254 reaches the intermediate position. In some embodiments, the intermediate position is within a range of 30-44 degrees relative to the frame 252. As the head section 254 drops, the pivot joint 714 moves with the roller 830 along the rail 800 until the roller 830 contacts the stop 840. The roller 830 engages the stop 840 when the head section 254 reaches the intermediate position during downward movement of the head section 254 to prevent the pivot joint 714 of the CPR homing link 700 from moving along the channel 820 during further downward movement of the head section 254 from the intermediate position to a lowered position.

When the roller 830 contacts the stop 840, the CPR homing link 700 is prevented from moving along the rail 800 but continues to rotate relative to the head section 254 and the moveable frame 262 to guide the head section 254 so that an angle 720 between the CPR homing link 700 and the moveable frame 262 is decreased. Decreasing the angle 720 results in the CPR homing link 700 pushing the moveable frame 262 in the direction of arrow 730 away from the head end 52 of bed 50 and toward the retracted position 263. That is, engagement of the roller 830 with the stop 840 results in the CPR homing link 700 acting through the head section 254 to push the moveable frame 262 back into the retracted position during downward movement of the head section 254 from the intermediate position to the lowered position.

In some embodiments, movement of the moveable frame 262 due to actuation of the CPR pedal 610 or lever 718 causes the actuator 270 to return to the locked position 273. In other embodiments, the actuator 270 remains in the unlocked position 275 and the moveable frame 262 moves relative to the actuator 270. Further, movement of the moveable frame 262 from actuation of the CPR pedal 610 or handle 718 causes the upper panel 290 to move toward the retracted position 293. During movement of the head section 254 downwardly, the rotating link 702 moves away from the pivot joint 714 as the head section 254 lowers. That is, a spacing between a lower end of the rotating link 702 and the pivot joint 714 of the CPR homing link 700 increases as the head section lowers 254 from the raised position to the lowered position. On the other hand, a distance between the pivot joint 710 at the upper end of the CPR link and the pivot joint at the upper end of the rotating link 702 and the head section 254 remains constant as the head section 254 moves between the raised and lowered positions.

As the head section 254 lowers downwardly from the intermediate position of FIG. 24 to the lowered position of FIG. 25, the roller 830 remains nested in the stop 840 and the moveable frame 262 is moved into the retracted position 263. In some embodiments, the moveable frame 262 reaches the retracted position 263 when the head section 254 is positioned at about 15 degrees relative to the frame 252. In such embodiments, further downward movement of the head section 254 from the 15 degree angle into the lowered positions causes pivot joint 266 to move along the now-stationary movable frame 262. Additionally, the upper panel 290 is moved closer to the retracted position 293 as the head section 254 lowers in response to activation of the emergency CPR release function of bed 50. In some embodiments, the upper panel 290 is moved entirely into the retracted position 293 when the head section 254 is positioned at about 15 degrees relative to the frame 252.

Referring to FIG. 25, the head section 254 is in the lowered position at an approximately 0 degree angle relative to the frame 252. CPR may be administered to the patient when the head section 254 is at the 0 degree angle. At the 0 degree angle, the moveable frame 262 is moved entirely into the retracted position 263. Additionally, the upper panel 290 is moved entirely into the retracted position 293. At the 0 degree angle, the actuator 270 may be moved entirely into the locked position 273 as well. In some embodiments, at the 0 degree angle, the actuator 270 may remain in the unlocked position 275. The CPR homing link 700 nests behind a head end siderail connection bracket 705 when the head section 254 is lowered, as illustrated in FIG. 25.

Accordingly, an exercise regimen may be quickly exited by actuating the CPR pedal 610 or handle 718. By unlocking the head section 254 and enabling the head section 254 to quickly drop relative to the frame 252, the CPR homing link 700 returns the moveable frame 262 to the retracted position 263 as the head section 254 is lowered. As such, in the event of cardiac arrest of the patient during the exercise regimen, the apparatus 50 may be quickly returned to a flat position that enables the administration of CPR. In some embodiments, actuation of the CPR pedal 610 or lever 718 causes the actuator 270 to return to the locked position 273. In an embodiment wherein the actuator 270 remains in the unlocked positioned 275 after actuation of the CPR pedal 610 or lever 718, a caregiver or other user may return the bed to a non-exercise setting after CPR is administered. For example, after CPR is administered, the display 202 may prompt the user to return the actuator 270 to the locked position 273.

Any theory, mechanism of operation, proof, or finding stated herein is meant to further enhance understanding of principles of the present disclosure and is not intended to make the present disclosure in any way dependent upon such theory, mechanism of operation, illustrative embodiment, proof, or finding. It should be understood that while the use of the word preferable, preferably or preferred in the description above indicates that the feature so described can be more desirable, it nonetheless cannot be necessary and embodiments lacking the same can be contemplated as within the scope of the disclosure, that scope being defined by the claims that follow.

In reading the claims it is intended that when words such as "a," "an," "at least one," "at least a portion" are used there is no intention to limit the claim to only one item unless specifically stated to the contrary in the claim. When the language "at least a portion" and/or "a portion" is used the item can include a portion and/or the entire item unless specifically stated to the contrary.

It should be understood that only selected embodiments have been shown and described and that all possible alternatives, modifications, aspects, combinations, principles, variations, and equivalents that come within the spirit of the disclosure as defined herein or by any of the following claims are desired to be protected. While embodiments of the disclosure have been illustrated and described in detail in the drawings and foregoing description, the same are to be considered as illustrative and not intended to be exhaustive or to limit the disclosure to the precise forms disclosed. Additional alternatives, modifications and variations can be apparent to those skilled in the art. Also, while multiple inventive aspects and principles can have been presented, they need not be utilized in combination, and many combinations of aspects and principles are possible in light of the various embodiments provided above.

The invention claimed is:

1. A patient support apparatus comprising:

a frame, an articulated deck coupled to the frame, the articulated deck including a head section, a seat section, a thigh section, and a foot section, and the seat section including a stationary frame coupled to the frame and a moveable frame that is moveable relative to the stationary frame, wherein the moveable frame is moveable between a retracted position in which the moveable frame of the seat section is positioned adjacent the thigh section, and an extended position in which the moveable frame of the seat section is separated away from the thigh section, so that a patient positioned on the patient support apparatus is enabled to exercise by moving the moveable frame between the retracted position and the extended position, wherein the moveable frame of the seat section is locked from being moveable relative to the stationary frame unless the head section is pivotably raised upwardly beyond a threshold angle.

2. The patient support apparatus of claim 1, wherein the moveable frame is moveable within a range of 1 inch to 12 inches relative to the stationary frame.

3. A patient support apparatus comprising:

a frame, an articulated deck coupled to the frame, the articulated deck including a head section, a seat section, a thigh section, and a foot section, and the seat section including a stationary frame coupled to the frame and a moveable frame that is moveable relative to the stationary frame, wherein the moveable frame is moveable between a retracted position in which the moveable frame of the seat section is positioned adjacent the thigh section, and an extended position in which the moveable frame of the seat section is separated away from the thigh section, so that a patient positioned on the patient support apparatus is enabled to exercise by moving the moveable frame between the retracted position and the extended position, wherein the moveable frame of the seat section is locked from being moveable relative to the stationary frame unless the articulated deck is tilted to a predetermined angle.

4. The patient support apparatus of claim 1, further comprising an actuator that is moveable between a locking position and an unlocking position, wherein the moveable frame is unlocked for movement relative to the stationary frame in response to the actuator being moved to the unlocking position.

5. The patient support apparatus of claim 4, wherein after the exercise is finished, the actuator returns to the locking position thereby returning the moveable frame to the retracted position.

6. The patient support apparatus of claim 1, wherein the seat section includes a pair of panels, wherein a first panel of the pair of panels is coupled to the moveable frame to move therewith and a second panel of the pair of panels is coupled to the stationary frame.

7. The patient support apparatus of claim 6, wherein the first panel includes at least one flange and the second panel is adjacent the flange.

8. The patient support apparatus of claim 7, wherein the at least one flange includes a pair of flanges and the sides of the second panel are adjacent respective flanges of the pair of flanges.

9. The patient support apparatus of claim 6, wherein, when the moveable frame is in the extended position, the second panel extends across a gap formed between the first panel and the thigh section.

10. The patient support apparatus of claim 1, wherein the frame includes at least one track and the moveable frame moves along the track when the moveable frame moves between the retracted position and the extended position.

11. The patient support apparatus of claim 1, wherein the head section is pivotably coupled to the moveable frame of the seat section.

12. The patient support apparatus of claim 11, wherein the head section is pivotable relative to the moveable frame regardless of whether the moveable frame is in the retracted position, the extended position, or any position between the retracted and extended positions.

13. The patient support apparatus of claim 1 further comprising a cardiopulmonary resuscitation (CPR) homing link coupled between the head section and the frame, and wherein the CPR homing link is configured to guide lowering of the head section relative to the frame in response to an emergency CPR function being activated.

14. The patient support apparatus of claim 13, further comprising a manual CPR input that is moved manually to activate the emergency CPR function.

15. A patient support apparatus comprising:

a frame, an articulated deck coupled to the frame, the articulated deck including a head section, a seat section, a thigh section, and a foot section, and the seat section including a stationary frame coupled to the frame and a moveable frame that is moveable relative to the stationary frame, wherein the moveable frame is moveable between a retracted position in which the moveable frame of the seat section is positioned adjacent the thigh section, and an extended position in which the moveable frame of the seat section is separated away from the thigh section, so that a patient positioned on the patient support apparatus is enabled to exercise by moving the moveable frame between the retracted position and the extended position, wherein the moveable frame of the seat section is locked from being moveable relative to the stationary frame unless the foot section is moved to a retracted foot section position.

16. A patient support apparatus comprising:

a frame, an articulated deck coupled to the frame, the articulated deck including a head section, a seat section, a thigh section, and a foot section, and the seat section including a stationary frame coupled to the frame and a moveable frame that is moveable relative to the stationary frame, wherein the moveable frame is moveable between a retracted position in which the moveable frame of the seat section is positioned adjacent the thigh section, and an extended position in which the moveable frame of the seat section is separated away from the thigh section, so that a patient positioned on the patient support apparatus is enabled to exercise by moving the moveable frame between the retracted position and the extended position, wherein the moveable frame of the seat section is locked from being moveable relative to the stationary frame unless a foot rest is positioned between the foot section and the patient.

17. The patient support apparatus of claim 3, wherein the predetermined angle is between 1 degree and 20 degrees.

18. A patient support apparatus comprising:

a frame, an articulated deck coupled to the frame, the articulated deck including a head section, a seat section, a thigh section, and a foot section, and the seat section including a stationary frame coupled to the frame and a moveable frame that is moveable relative to the stationary frame, wherein the moveable frame is moveable between a retracted position in which the moveable frame of the seat section is positioned adjacent the thigh section, and an extended position in which the moveable frame of the seat section is separated away from the thigh section, so that a patient positioned on the patient support apparatus is enabled to exercise by moving the moveable frame between the retracted position and the extended position, wherein the moveable frame of the seat section is locked from being moveable relative to the stationary frame unless one or more casters coupled to the frame are braked.

19. A patient support apparatus comprising:

a frame, an articulated deck coupled to the frame, the articulated deck including a head section, a seat section, a thigh section, and a foot section, and the seat section including a stationary frame coupled to the frame and a moveable frame that is moveable relative to the stationary frame, wherein the moveable frame is moveable between a retracted position in which the moveable frame of the seat section is positioned adjacent the thigh section, and an extended position in which the moveable frame of the seat section is separated away from the thigh section, so that a patient positioned on the patient support apparatus is enabled to exercise by moving the moveable frame between the retracted position and the extended position, wherein the moveable frame of the seat section is locked from being moveable relative to the stationary frame unless at least one siderail coupled to the frame is in a raised position.

20. The patient support apparatus of claim 19, wherein the at least one siderail comprises a first siderail adjacent a right side of the frame and a second siderail adjacent a left side of the frame, and wherein the moveable frame of the seat section is locked from being moveable relative to the stationary frame unless the first and second siderails are both in the raised position.

21. A patient support apparatus comprising:

a frame, an articulated deck coupled to the frame, the articulated deck including a head section, a seat section, a thigh section, and a foot section, and the seat section including a stationary frame coupled to the frame and a moveable frame that is moveable relative to the stationary frame, wherein the moveable frame is moveable between a retracted position in which the moveable frame of the seat section is positioned adjacent the thigh section, and an extended position in which the moveable frame of the seat section is separated away from the thigh section, so that a patient positioned on the patient support apparatus is enabled to exercise by moving the moveable frame between the retracted position and the extended position, wherein the frame includes at least one track and the moveable frame moves along the track when the moveable frame moves between the retracted position and the extended position, and wherein the frame includes a first track oriented in a first direction and a second track oriented in a second direction, wherein the orientation of the first track is 90 degrees relative to the orientation of the second track, wherein the moveable frame moves along the first track and the second track when the moveable frame moves between the retracted position and the extended position.

22. A patient support apparatus comprising:

a frame, an articulated deck coupled to the frame, the articulated deck including a head section, a seat section, a thigh section, and a foot section, and the seat section including a stationary frame coupled to the frame and a moveable frame that is moveable relative to the stationary frame, wherein the moveable frame is moveable between a retracted position in which the moveable frame of the seat section is positioned adjacent the thigh section, and an extended position in which the moveable frame of the seat section is separated away from the thigh section, so that a patient positioned on the patient support apparatus is enabled to exercise by moving the moveable frame between the retracted position and the extended position, wherein the head section is pivotably coupled to the moveable frame of the seat section, and wherein a lower end of the head section is coupled to the moveable frame by a pivot joint that translates along the moveable frame as the head section is pivotably raised and lowered.

23. A patient support apparatus comprising:

a frame, an articulated deck coupled to the frame, the articulated deck including a head section, a seat section, a thigh section, and a foot section, and the seat section including a stationary frame coupled to the frame and a moveable frame that is moveable relative to the stationary frame, wherein the moveable frame is moveable between a retracted position in which the moveable frame of the seat section is positioned adjacent the thigh section, and an extended position in which the moveable frame of the seat section is separated away from the thigh section, so that a patient positioned on the patient support apparatus is enabled to exercise by moving the moveable frame between the retracted position and the extended position, wherein the head section is pivotably coupled to the moveable frame of the seat section, and wherein the head section is locked out from pivoting relative to the moveable frame unless the moveable frame is in the retracted position.

* * * * *